United States Patent
Sato

(10) Patent No.: US 7,464,338 B2
(45) Date of Patent: Dec. 9, 2008

(54) INFORMATION PROCESSING APPARATUS AND METHOD FOR CONTROLLING THE SAME

(75) Inventor: Noriaki Sato, Yokohama (JP)

(73) Assignee: Cannon Kabushiki Kaisha, Tokyo (JP)

( * ) Notice: Subject to any disclaimer, the term of this patent is extended or adjusted under 35 U.S.C. 154(b) by 300 days.

(21) Appl. No.: 11/331,774

(22) Filed: Jan. 13, 2006

(65) Prior Publication Data

US 2006/0168531 A1 Jul. 27, 2006

(30) Foreign Application Priority Data

Jan. 21, 2005 (JP) ............................. 2005-014681

(51) Int. Cl.
*G06F 3/00* (2006.01)
(52) U.S. Cl. ................. 715/750; 715/751; 715/754; 715/761; 715/764; 715/856
(58) Field of Classification Search ......... 715/750–751, 715/754, 761, 764, 856
See application file for complete search history.

(56) References Cited

U.S. PATENT DOCUMENTS

| | | | | |
|---|---|---|---|---|
| 5,561,811 | A * | 10/1996 | Bier | 710/5 |
| 5,586,243 | A * | 12/1996 | Barber et al. | 715/856 |
| 5,654,726 | A * | 8/1997 | Mima et al. | 345/2.2 |
| 6,215,486 | B1 * | 4/2001 | Walls et al. | 715/733 |
| 6,791,530 | B2 * | 9/2004 | Vernier et al. | 345/156 |
| 6,859,928 | B2 * | 2/2005 | Wright | 718/102 |
| 6,894,703 | B2 * | 5/2005 | Vernier et al. | 345/619 |
| 7,209,948 | B2 * | 4/2007 | Srinivasa | 709/204 |
| 7,222,305 | B2 * | 5/2007 | Teplov et al. | 715/751 |
| 7,260,784 | B2 * | 8/2007 | Crichton | 715/751 |
| 7,269,794 | B2 * | 9/2007 | Martinez et al. | 715/758 |
| 2002/0163537 | A1 * | 11/2002 | Vernier et al. | 345/751 |
| 2003/0179230 | A1 * | 9/2003 | Seidman | 345/750 |

(Continued)

FOREIGN PATENT DOCUMENTS

JP 05-153310 6/1993

(Continued)

OTHER PUBLICATIONS

Dewan, Prasun and Choudhary, Rajiv, A High-Level and Flexible Framework for Implmenting Multiuser User Interfaces, Purdue University, ACM Transactions and Information Systems, vol. 10, No. 4, Oct. 1992, pp. 345-380.*

(Continued)

*Primary Examiner*—William L Bashore
*Assistant Examiner*—Ashraf Zahr
(74) *Attorney, Agent, or Firm*—Canon U.S.A., Inc., IP Division

(57) ABSTRACT

An information processing apparatus connects a plural coordinate input apparatus to a common screen display apparatus. The common screen display apparatus displays a common screen shared by a plurality of users. The plural coordinate input apparatus detects coordinate values instructed by a plurality of coordinate pointers and generates plural coordinate data. An input allocating section determines either supplying the coordinate data to an application or acquiring control authority and issuing an event to an operating system, based on the coordinate data entered from the coordinate input apparatus and position and back-and-forth relationship of windows of a plurality of applications displayed on the display apparatus.

14 Claims, 20 Drawing Sheets

U.S. PATENT DOCUMENTS

| | | | |
|---|---|---|---|
| 2004/0046784 A1* | 3/2004 | Shen et al. | 345/733 |
| 2005/0193328 A1* | 9/2005 | Agrawala et al. | 715/513 |
| 2005/0198578 A1* | 9/2005 | Agrawala et al. | 715/750 |
| 2005/0229108 A1* | 10/2005 | Sadek et al. | 715/764 |

FOREIGN PATENT DOCUMENTS

| | | |
|---|---|---|
| JP | 08-036546 | 2/1996 |
| JP | 2003-099196 | 4/2003 |

OTHER PUBLICATIONS

Dewan, Prasun and Shen, Hoghai, Controlling Access in Multiuser Interfaces, ACM Transactions on Computer-Human Interaction, vol. 5, No. 1, Mar. 1998, pp. 34-62.*

Dietz, Paul and Leigh, Darren, Diamond Touch: A Multi-User Touch Technology, UIST 01, ACM 2001, 1-58113-438.*

Gupta, Anurag, An Adaptive Approach to Collecting Multimodal Input, 2003, Proceedings of the 41st Annual Meeting on Association for Computational Linguistics—vol. 2, pp. 31-36.*

* cited by examiner

FIG.5A

DRAG MANAGEMENT LIST ~400

| Index | IDENTIFIER | DRAG FLAG |
|---|---|---|
| 0 | 0 | TRUE |
| 1 | 1 | FALSE |
| 2 | 2 | FALSE |
| ... | ... | ... |

FIG.5B

Z-ORDER LIST ~401

| Index | WINDOW HANDLE |
|---|---|
| 0 | 23150 |
| 1 | 16492 |
| 2 | 80256 |
| ... | ... |

FIG.5C

TRANSPARENT OPERATION SURFACE LIST ~402

| Index | WINDOW HANDLE | Z-ORDER INDEX |
|---|---|---|
| 0 | 23150 | 0 |
| 1 | 16492 | 3 |
| 2 | 80256 | 12 |
| ... | ... | ... |

OPERATION MANAGEMENT LIST ⟋900

| Index | IDENTIFIER | DRAG FLAG | PREVIOUS COORDINATES | PLOTTING COLOR |
|---|---|---|---|---|
| 0 | 0 | TRUE | (10, 50) | Black |
| 1 | 1 | FALSE | (0, 0) | Green |
| 2 | 2 | FALSE | (0, 0) | Red |
| ⋮ | ⋮ | ⋮ | ⋮ | ⋮ |

FIG.20

IDENTIFIER MANAGEMENT LIST ─ 1800

| Index | DEVICE IDENTIFIER | IDENTIFIER |
|---|---|---|
| 0 | XYZ0001 | 0 |
| 1 | XYZ0002 | 1 |
| 2 | JIOGIZZ | 2 |
| ⋮ | ⋮ | ⋮ |

INFORMATION PROCESSING APPARATUS AND METHOD FOR CONTROLLING THE SAME

BACKGROUND OF THE INVENTION

1. Field of the Invention

The present invention relates to an information processing apparatus that allows a plurality of users to commonly use a display screen, more particularly to an information processing apparatus that controls the display of an image based on coordinate information entered by the users and also controls execution of related programs.

Furthermore, the present invention relates to a method for controlling the information processing apparatus.

2. Description of the Related Art

The spread of personal computers has promoted the computerization of the office environment This includes the computerization of an employee's desk or cube, as well as other areas within the office environment such as conference rooms. A representative computerized product for a conference room is a so-called electronic conference system that includes a computerized white board. A remote-control system allowing a plurality of users to simultaneously use such an electronic conference system is already known.

Conventional conferences typically include the use of a projector that projects the screen of a laptop or notebook personal computer in addition to the use of a standard non-electronic white board. The standard non-electronic white board is generally equipped with a plurality of pens so that users can freely draw on the board.

Japanese Laid-open Patent Application No. 05-153310 proposes a system that can synchronize plotting data shared among a plurality of computerized devices connected to a network. The proposed system can execute a white board application that is simultaneously available for a plurality of users, when a screen of one computerized device is displayed on a common display apparatus and respective users have computerized devices.

Furthermore, Japanese Laid-open Patent Application No. 08-36546 proposes a system that can share display data of a particular application in addition to synchronization of plotting data shared among a plurality of computerized devices connected to a network. According to the proposed system, one user can operate on an application while other users perform plotting.

Furthermore, Japanese Laid-open Patent Application No. 2003-99196 proposes a system that can input a plurality of coordinate values to a common image display apparatus. According to the proposed system, the common image display apparatus can project screens of computerized devices. The common image display apparatus is equipped with a detecting unit that detects a plurality of coordinates, so that screens of display apparatuses of respective computerized devices can be projected as a composed image.

In this manner, simultaneous plotting is already realized by a plurality of computerized devices connected to a network.

Furthermore, according to another technique for a conference system, a plurality of computerized devices can share screen data of a host computer and plotting data on a dedicated application. Only one computerized device is allowed to remotely control the host computer to avoid interference of remote controls by a plurality of computerized devices. The proposed technique allows a plurality of computerized devices to simultaneously plot on a dedicated application.

The above systems require coordinate input apparatuses connected to the computerized devices. To realize the above-described simultaneous operations by a plurality of computerized devices, coordinate values must be input from the coordinate input apparatuses connected to the computerized devices. Plotting data must be produced based on the input data. The plotting data must be shared among the computerized devices.

Each computerized device may only function as an interface between its coordinate input apparatus and a network. In such a case, operations of respective users will interfere with each other because one computerized device is simply (i.e., without any restrictions) connected to a plurality of coordinate input apparatuses.

More specifically, a computerized device outputs plotting data to a display apparatus that displays a common screen. When the computerized device is simply connected to a plurality of coordinate input apparatuses, a plurality of users may simultaneously input coordinate data via a plurality of coordinate input apparatuses. Interference of operations typically occurs in such an arrangement.

Occurrence of interference is due to the fact that, according to a conventional window system, a focused window is selected as an operation target among a plurality of windows. In other words, even if one computerized device is connected to a plurality of coordinate input apparatuses, the computerized device can operate for only one target.

Thus, when coordinate values are simultaneously entered from a plurality of coordinate input apparatuses, conflict occurs to get an operation target. In other words, the operation of the computerized device interrupts every time the coordinate input apparatus is switched.

For example, one computerized device can be equipped with a mouse and a tablet, each serving as a pointing device, so that users A and B can operate the computerized device. User A may operate the mouse to draw a line on a plotting application screen (or window), while user B may access a browser to enjoy net surfing.

Under such a situation, the line on the plotting application screen may be unintentionally drawn to a point whose coordinates are instructed by the other user. Thus, the operation of user B obstructs the operation of user A.

To solve the above drawbacks, a conventionally proposed method gives a priority to one apparatus if it entered the coordinate data earlier than others, and designates it as an operable coordinate input apparatus. However, according to the method, only one coordinate input apparatus is allowed to input coordinate data. When one computerized device simultaneously receives coordinate values from a plurality of coordinate input apparatuses, the computerized device cannot realize simultaneous operations using a plurality of coordinate input apparatuses.

Furthermore, the simultaneous plotting can be realized by a dedicated common screen display apparatus that is equipped with a plurality of coordinate input apparatuses and processing units. However, according to such a method, the computerized device currently displaying an image on the common screen display apparatus cannot be operated by a coordinate input apparatus equipped in the common screen display apparatus.

Therefore, a user must switch the coordinate input apparatus to change the operation of the computerized device from the simultaneous plotting to another operation.

SUMMARY OF THE INVENTION

The present invention is directed to an information processing apparatus that allows a plurality of users to simultaneously operate a common screen through their coordinate input apparatuses (i.e., input apparatuses outputting plural coordinates) connected to the information processing apparatus.

The present invention is also directed to a method for controlling the information processing apparatus.

More specifically, one aspect of the present invention provides an information processing apparatus including a display unit, a coordinate input unit, a window order memorizing unit, a determination unit, and an event issuing unit. The display unit displays a common screen shared by a plurality of users. The coordinate input unit detects coordinate values instructed by a plurality of coordinate pointers and generates plural coordinate data. The window order memorizing unit memorizes position and back-and-forth relationship of windows of a plurality of applications displayed on the display unit. The determination unit determines an application to which the coordinate data are supplied, based on the coordinate data entered from the coordinate input unit, and the position and the back-and-forth relationship of the windows memorized in the window order memorizing unit. The event issuing unit acquires control authority based on identification information accompanying the coordinate data when the determination unit failed in determining the application, and issues an event to an operating system.

Another aspect of the present invention provides a method for controlling an information processing apparatus that connects a coordinate input apparatus to a display apparatus, wherein the display apparatus displays a common screen shared by a plurality of users and the coordinate input apparatus detects coordinate values instructed by a plurality of coordinate pointers and generates plural coordinate data. The method includes a window order memorizing step, a determination step, and an event issuing step. The window order memorizing step is for memorizing position and back-and-forth relationship of windows of a plurality of applications displayed on the display apparatus. The determination step is for determining an application to which the coordinate data are supplied, based on the coordinate data entered from the coordinate input apparatus and the position and the back-and-forth relationship of the windows memorized in the window order memorizing step. The event issuing step is for acquiring control authority based on identification information accompanying the coordinate data when determining the application is failed in the determination step, and for issuing an event to an operating system.

According to the present invention, users can simultaneously operate a common screen through their coordinate input apparatuses, each outputting plural coordinates.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A to 5C are views respectively showing examples of a drag management list, a Z-order list, and a transparent operation surface list that are managed by an input allocating section in accordance with first embodiment of the present invention.

FIG. 20 is a view showing one example of an identifier management list stored in an identifier adding section in accordance with the third embodiment of the present invention.

DETAILED DESCRIPTION OF THE EMBODIMENTS

Exemplary embodiments of the present invention will now be described in detail in accordance with the accompanying drawings.

First Embodiment

Figure 1:
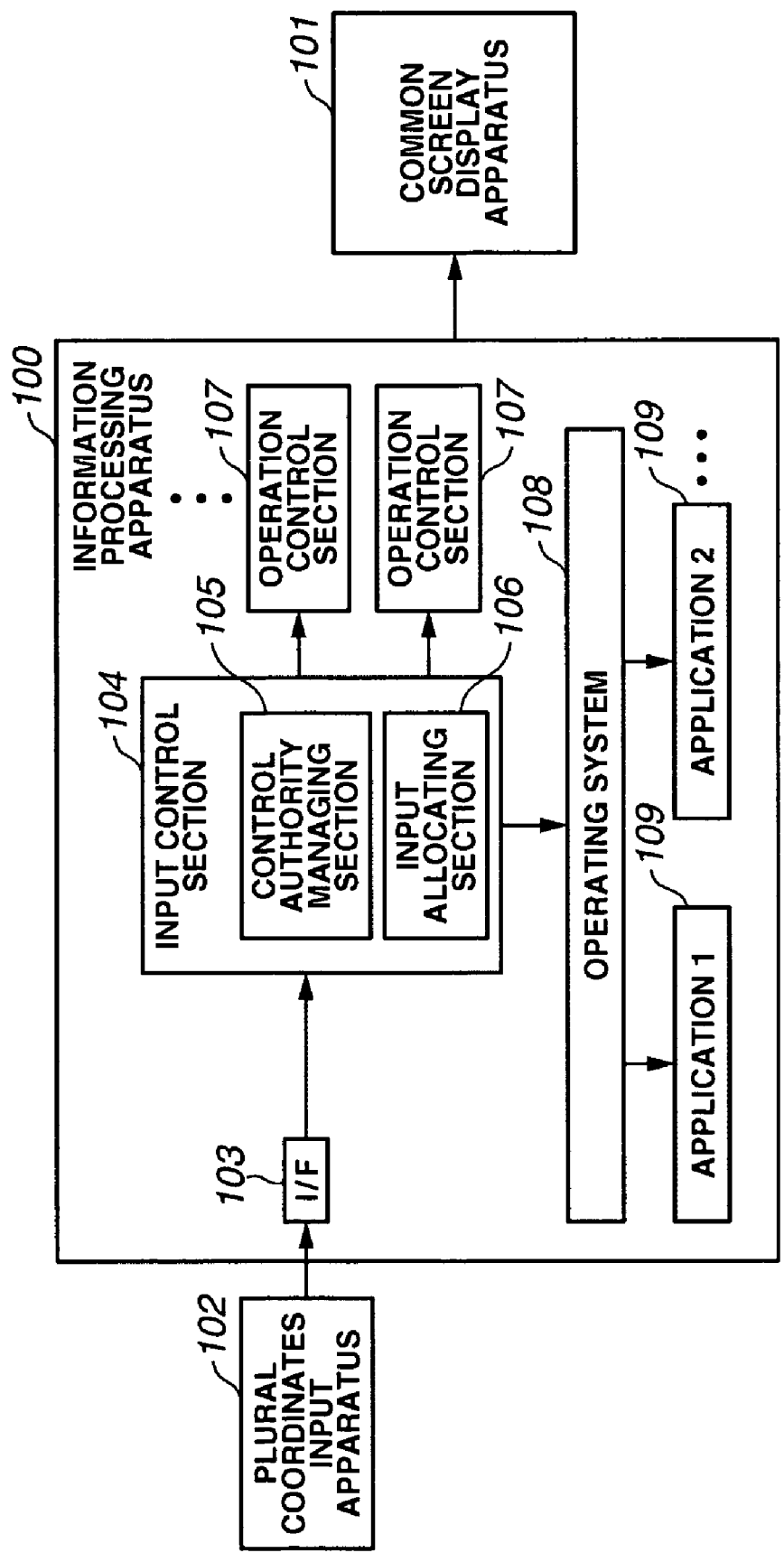
FIG. 1 is a block diagram showing a functional arrangement of a cooperative work supporting system in accordance with a first embodiment of the present invention.

FIG. 1 is a block diagram showing a functional arrangement of a cooperative work supporting system in accordance with a first embodiment of the present invention.

In FIG. 1, an information processing apparatus 100 for a personal computer (PC) or a workstation is connected to a plural coordinates input apparatus 102 that can simultaneously input a plurality of coordinate values and to a common screen display apparatus 101 that displays an image based on plural coordinate values entered from the plural coordinates input apparatus 102. Furthermore, the information processing apparatus 100 is connected to other peripheral apparatuses or devices, although not shown in the drawing.

The common screen display apparatus 101 is a display apparatus that displays an image based on display data produced from the information processing apparatus 100. The common screen display apparatus 101 is arranged, for example, from a screen of a rear projection display, a PDP, or a projector. The plural coordinates input apparatus 102 is a coordinate input apparatus that inputs coordinate values via the common screen display apparatus 101 and is, for example, equipped with a digitizer or a touch panel. The plural coordinates input apparatus 102 can simultaneously detect parallel input of a plurality of coordinate values entered from a plurality of pens or other coordinate pointers.

The plural coordinates input apparatus 102 can output the detected plural coordinate values to the information processing apparatus 100. The data entered from the plural coordinates input apparatus 102 include coordinate values instructed by respective coordinate pointers as well as button information and identifier of each coordinate pointer. The identifier is information for identifying a coordinate pointer corresponding to each of simultaneously detected plural coordinate values.

For example, a digitizer equipped with a plurality of pens has identifiers for respective pens. Coordinate values instructed by a particular pen are output together with the identifier of the pen. However, if the plural coordinates input apparatus 102 does not have such an identifier adding function, an interface (I/F) 103 will be able to add an identifier to the coordinate values.

Although the plural coordinates input apparatus 102 shown in FIG. 1 is only one, a plurality of plural coordinates input apparatuses 102 can be connected to the information processing apparatus 100. In this case, each input apparatus 102 has a unique identifier, so that simultaneous operations using a plurality of input apparatuses 102 become feasible. For example, the plural coordinates input apparatus 102 can include a unique product number as identifier or as part of identifier. The interface 103 can include a process ID as identifier or as part of identifier.

The input control section 104 can detect a process ID of a transmitter upon receiving input data and therefore, can include the process ID of the transmitter as identifier or as part of identifier. Thus, the identifiers can be independent from each other. In the information processing apparatus 100, input data processed by the interface 103 is sent to the input control section 104. The input control section 104 includes a control authority managing section 105 that manages transmission authority for a system-mouse event supplied to an operating system 108.

Furthermore, the input control section 104 includes an input allocating section 106 that determines whether the input data should be sent to an operation control section 107 or to an operating system 108 and outputs the data to the operation control section 107 or the operating system 108. The operation control section 107 is an operating unit that performs, according to a later-described operation method, operations according to the input data for each identifier of the data.

The operating system 108 receives a system-mouse event allocated by the input allocating section 106 and processes the system-mouse event under management of the control authority managing section 105. More specifically, the operating system 108 notifies, at the coordinates where an event is generated based on the entered coordinate data, an application 109 of the system-mouse event. The application 109 is the frontmost one (i.e., focused one) displayed on the common screen display apparatus 101.

The control authority managing section 105 manages the transmission authority for a system-mouse event supplied to the operating system 108, and restricts an identifier that is operable by other than the operation control section 107 to only one. Thus, except for the operation control section 107, no interference occurs between operable identifiers. The control authority managing section 105 responds to a request of control authority from the input control section 104, and gives control authority to the requested identifier when any control authority is available.

The given control authority is automatically released after a predetermined time has passed. When data of the same identifier is input, or when a coordinate pointer (e.g., a pen or a mouse) having the same identifier is in a drag operation, the control authority is prevented from being released. Accordingly, the currently operating coordinate pointer having this identifier can exclusively execute, until the operation by the coordinate pointer terminates, the operation other than that of the operation control section 107.

However, the following exceptions may arise and appropriate solutions are required.

For example, in an event that a device (e.g., a coordinate input apparatus or a coordinate pointer) possessing the control authority is damaged or malfunctions, no response will be obtained from the device. Therefore, when a long time has passed since last input from a device having an identifier possessing the control authority, the control authority should be released from the device.

For example, a predetermined time can be set as a limit. When no data is input for the predetermined time from a device having an identifier possessing control authority, the control authority should be released from the device. Furthermore, although a user does not intend, data may be continuously input. In such a case, if coordinate values entered from a device having an identifier possessing the control authority do not change, the control authority should be released from the device.

For example, a predetermined time can be set as a limit number of times to N for discriminating continuous inputs of the same coordinate values. When the coordinate values of a device having the identifier possessing control authority do not change for the predetermined time, the control authority should be released from the device having the identifier.

Figure 2:
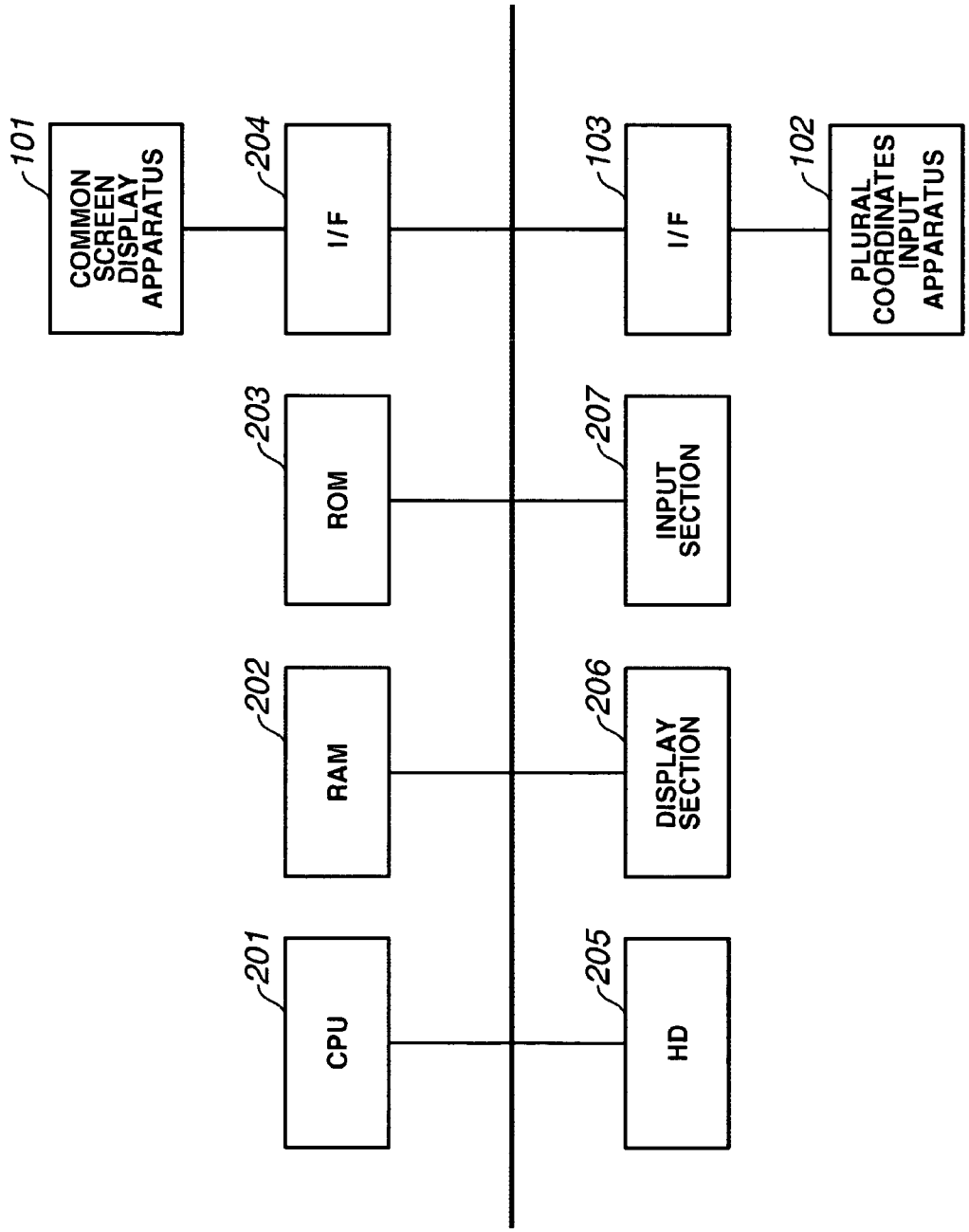
FIG. 2 is a block diagram showing a hardware arrangement of an information processing apparatus in accordance with the first embodiment of the present invention.

FIG. 2 is a block diagram showing a hardware arrangement of the information processing apparatus 100 in accordance with the embodiment of the present invention. The portions identical with those shown in FIG. 1 are denoted by the same reference numerals and will not be explained in the following.

In the drawing, CPU 201 executes later-described various controls in accordance with programs stored in RAM 202 or ROM 203 for the entire control of the apparatus 100. RAM 202 provides a work area that stores programs or data for CPU 201 and temporarily stores various data during the control processing of CPU 201. ROM 203 stores programs, such as BIOS, and various data.

An interface 204 is provided to control an interface for the above-described common screen display apparatus 101. An external memorizing apparatus (HD) 205 includes pre-installed OS (operating system) 108 and various applications 109. The OS 108 and the applications 109 can be loaded to RAM 202 and executed under control of CPU 201. The external memorizing apparatus 205 can also store image data and other various data.

A display section 206, provided in the information processing apparatus 100, is equipped with a display unit such as a CRT or liquid crystal display. An input section 207 has a pointing device, such as a keyboard or a mouse, which allows a user to input various data and commands according to operations.

Although the present embodiment depicts the common screen display apparatus 101 and the plural coordinates input apparatus 102 as members independent of the display section 206 and the input section 207, two display apparatuses can be integrated as a single hardware unit and also two input apparatuses can be integrated as a single hardware unit. The functions of the input control section 104 and the operation control sections 107 shown in FIG. 1 are realized by the programs loaded from HD 205 to RAM 202 and executed under control of CPU 201.

Figure 3:
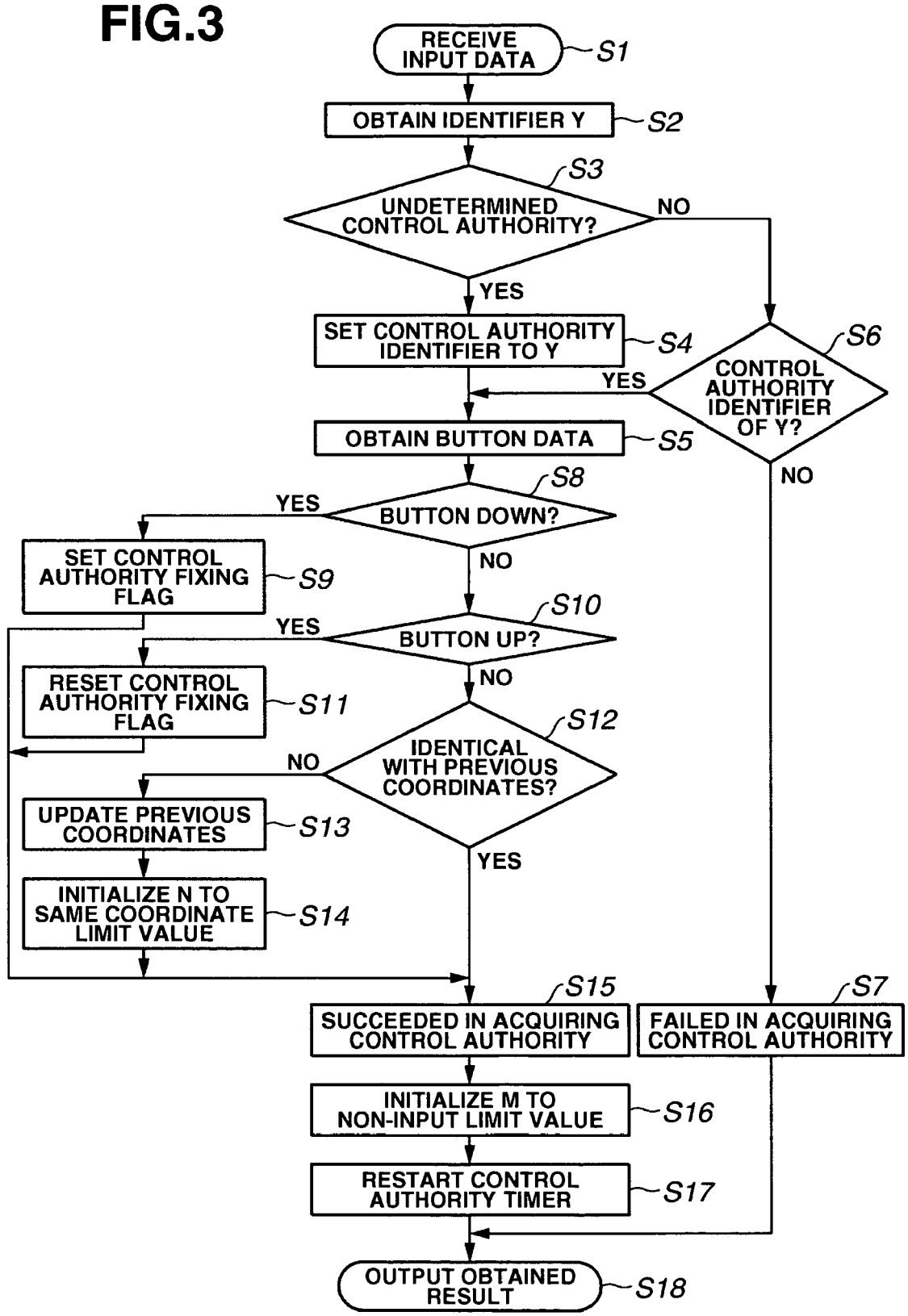
FIG. 3 is a flowchart showing an operation of a control authority managing section performed in response to a request of control authority from an input control section in accordance with the first embodiment of the present invention.

FIG. 3 is a flowchart showing an operation of the control authority managing section 105 performed in response to a request of control authority from the input control section 104 in accordance with the first embodiment of the present invention. Program for the processing is loaded to RAM 202 and executed under control of CPU 201.

First, in step S1, the control authority managing section 105 receives data from the coordinate input apparatus. Next, in step S2, the control authority managing section 105 obtains an identifier Y of the data received in step S1. Next, in step S3, it is determined whether there is any control authority identifier (i.e., an identifier currently possessing control authority) managed by the control authority managing section 105.

When the control authority identifier is "−1" that shows vacancy of the control authority (i.e., YES in step S3), the control flow proceeds to step S4 in which the control authority identifier is set to Y. Then, the control flow proceeds to step S5. When the control authority identifier is not "−1" in step S3 (i.e., NO in step S3), this means that control authority is already set for a particular identifier. Thus, the control flow proceeds to step S6 to further determine whether the control authority identifier is the identifier Y that is identical with the control authority for the data received in step S1.

When the control authority identifier is the identifier Y (i.e., YES in step S6), the control flow proceeds to step S5. When the control authority identifier is not the identifier Y (i.e., NO in step S6), the control flow proceeds to step S7, in which the control authority managing section 105 confirms failure in acquiring the control authority. Then, the control flow proceeds to step S18 to output an obtained result with respect to the control authority.

In step S5, the control authority managing section 105 obtains button data from the data received in step S1. Next, in step S8, it is determined whether the button data is Button Down. When the button data is Button Down (i.e., YES in step S8), the control flow proceeds to step S9 in which a control authority fixing flag is set to ON (to determine whether any drag operation is currently performed). The control authority managing section 105 holds the control authority fixing flag. Then, the control flow proceeds to step S15. When the button data is not Button Down (i.e., NO in step S8), the control flow proceeds to step S10 to further determine whether the button data is Button Up.

When the button data is Button Up (i.e., YES in step S10), the control flow proceeds to step S11 to reset the control authority fixing flag to OFF. Then, the control flow proceeds to step S15. When the button data is not Button Up (i.e., NO in step S10), the control flow proceeds to step S12 to further determine whether coordinate values of input data are identical with previous input coordinate values. The control authority managing section 105 holds the previous input coordinate values. When the coordinate values of input data are not identical with the previous input coordinate values (i.e., NO in step S12), the control flow proceeds to step S13 to replace the previous input coordinate values with new coordinate values.

Next, in step S14, the control authority managing section 105 initializes the value N to a same coordinate limit value Na. The value N is for counting a number of times with respect to continuous inputs of the same coordinate values. Then, the control flow proceeds to step S15. When the coordinate values of input data are identical with the previous input coordinate values (i.e., YES in step S12), the control flow proceeds to step S15 in which the control authority managing section 105 confirms success in acquiring the control authority. Then, the control flow proceeds to step S16 in which the control authority managing section 105 initializes a value M to a non-input limit value Ma. The value M is for counting a number of times with respect to continuous inputs not accompanied with coordinate values.

Next, in step S17, the control authority managing section 105 initializes and restarts a control authority timer. Then, the control flow proceeds to step S18 in which the control authority managing section 105 outputs an obtained result with respect to the control authority. The coordinate limit value Na is a limit number of times corresponding to a predetermined time during which the same coordinate values are continuously input.

When coordinate values entered from a device having a control authority identifier has not changed during a period of a predetermined time, corresponding to the limit number of times Na, the control authority is released from the device. Regarding the non-input limit value Ma, when the input from a device having a control authority identifier has not been received for a predetermined time corresponding to the non-input limit number of times Ma, the control authority is released from the device. The control authority timer issues a timeout event every time a predetermined time has passed. Upon restarting a count-up operation, the control authority timer is reset to a predetermined time (i.e. a time until timeout invent).

Figure 4:
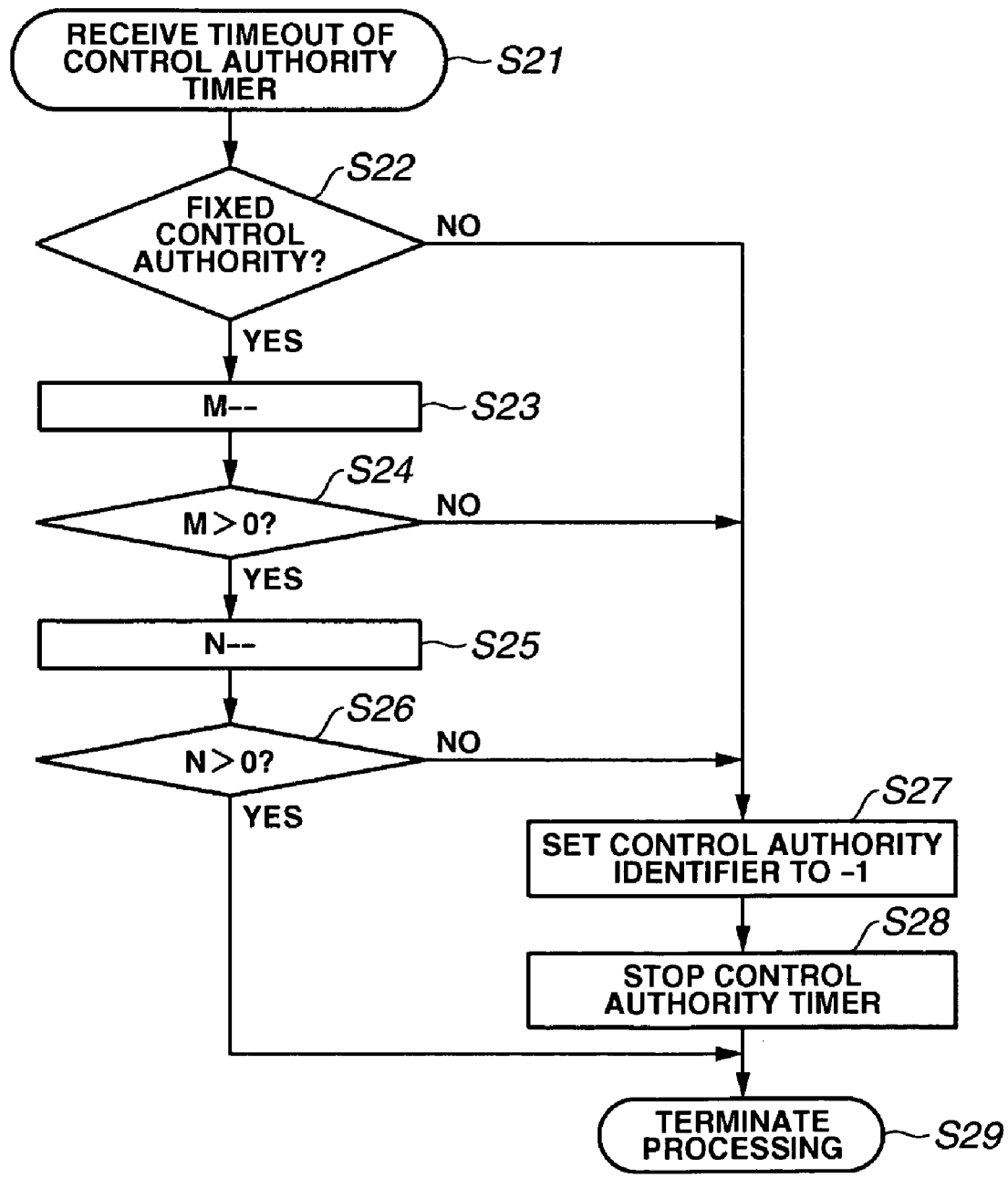
FIG. 4 is a flowchart showing an operation of the control authority managing section performed during timeout of a control authority timer in accordance with the first embodiment of the present invention.

FIG. 4 is a flowchart showing an operation of the control authority managing section 105 performed during timeout of the control authority timer in accordance with the first embodiment of the present invention. Program for the processing is loaded to RAM 202 and executed under control of the CPU 201.

In step S21, timeout of control authority timer is generated. Then, the control flow proceeds to step S22 in which the control authority managing section 105 checks the state of the control authority fixing flag. When the control authority is not fixed (i.e., NO in step S22), the control flow proceeds to step S27 to set the control authority identifier to "−1" that indicates vacancy of the control authority. Then, in step S28, the control authority timer stops its count-up operation. Next, in step S29, the control authority timer terminates the timeout processing.

When the control authority fixing flag is set in step S22 (i.e., YES in step S22), the control flow proceeds to step S23 to decrement M (i.e., M=M−1), wherein M represents a value for counting continuous inputs not accompanied with coordinate values. Then, in step S24, it is determined whether M is greater than 0. When M is not greater than 0 (i.e., NO in step S24), it is believed that a device possessing control authority is in a failed condition and accordingly no response is returned from the device. Thus, the control flow proceeds to step S27 in which the control authority is released.

When M is greater than 0 (i.e., YES in step S24), the control flow proceeds to step S25 to decrement N (i.e., N=N−1), wherein N represents a value for counting continuous inputs of the same coordinate values. Then, in step S26, it is determined whether N is greater than 0. When N is not greater than 0 (i.e., NO in step S26), it is presumed that data are continuously input from the coordinate input apparatus 102 although a user does not intend. Thus, the control flow proceeds to step S27 in which the control authority is released. When N is greater than 0 (i.e., YES in step S26), the control flow proceeds to step S29 to terminate the control authority timer timeout processing without changing the control authority.

FIGS. 5A to 5C respectively show examples of the drag management list, the Z-order list, and the transparent operation surface list that are managed by the input allocating section 106 in accordance with the present embodiment. RAM 202 stores these lists.

FIG. 5A shows a drag management list 400. The drag management list 400 includes a pair of data "Identifier" and "Drag flag" for each "Index", wherein "Drag flag" represents a current state of the drag operation performed by an input pen or a comparable coordinate pointer. More specifically, when the "Drag flag" is "TRUE", it means that the drag operation is currently performed. On the other hand, when the "Drag flag" is "FALSE", it means that the drag operation is not currently performed.

FIG. 5B shows a Z-order list 401. The Z-order list 401 includes, for each "Index", handles of all windows displayed on a common screen in the Z-order (in an order advancing from the front side of the screen to the rear side).

FIG. 5C shows a transparent operation surface list 402. The transparent operation surface list 402 includes, for each "Index", a pair of data "Window handle" and "Z-order Index" in the Z-order. The "Window handle" is, although transparent, a window handle of the operation control section 107 that obtains a mouse event based on coordinate data contained in the window region. The "Z-order Index" is an index of the Z-order list.

Figure 6:
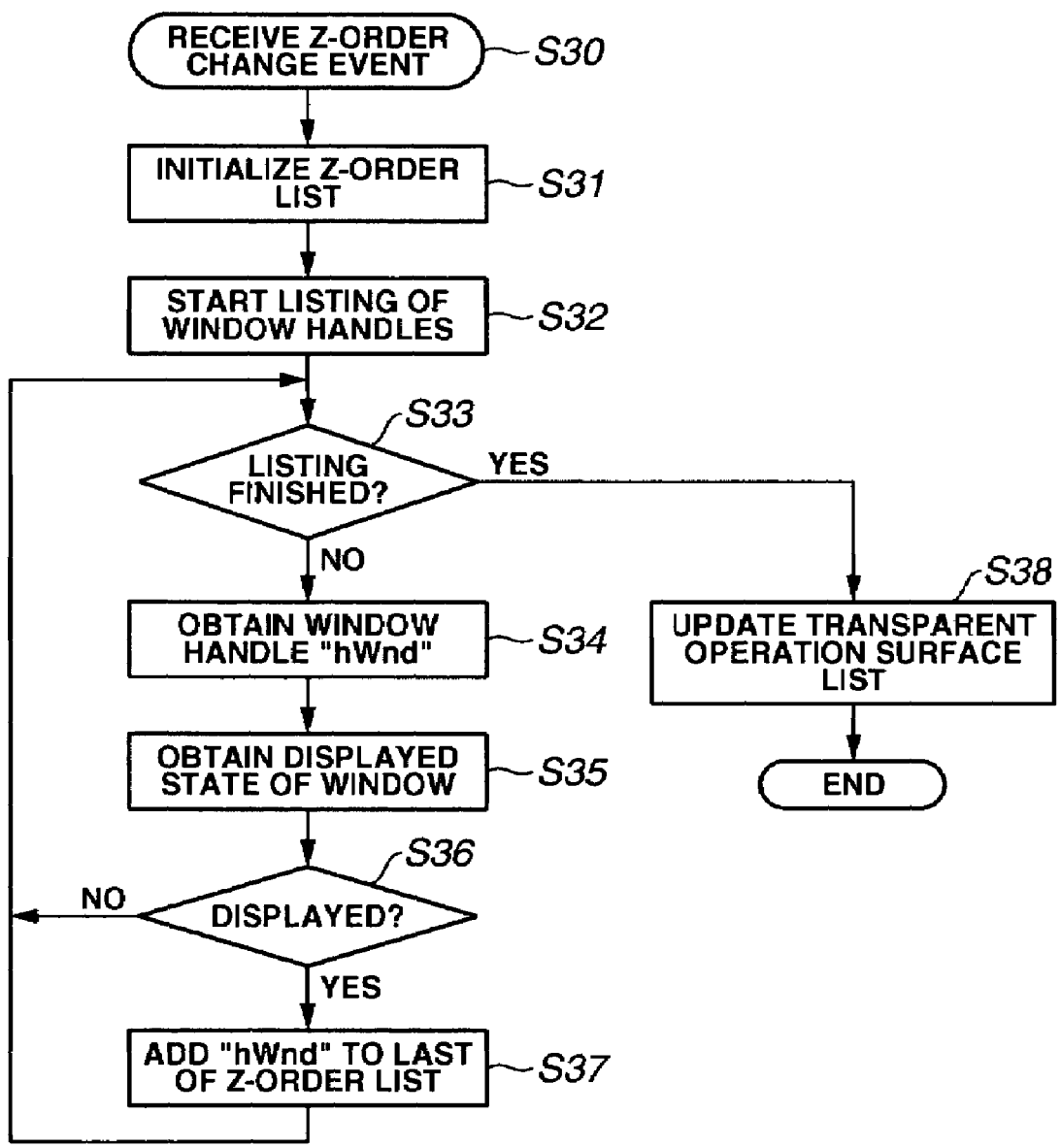
FIG. 6 is a flowchart showing an operation of the input allocating section that updates the Z-order list in response to a change of Z-order caused in an operating system in accordance with the first embodiment of the present invention.

FIG. 6 is a flowchart showing an operation of the input allocating section 106 that updates the Z-order list 401 in response to a change of Z-order caused in the operating system 108 in accordance with the present embodiment. Program for the processing is loaded to RAM 202 and executed under control of CPU 201.

The input allocating section 106 always monitors the operating system 108 and updates the Z-order list 401 and the transparent operation surface list 402 in response to a change of Z-order.

First, in step S30, the input allocating section 106 receives a change event of the Z-order. Then, the control flow proceeds to step S31 in which the input allocating section 106 initializes the Z-order list 401 shown in FIG. 5B. Next, in step S32, the input allocating section 106 requests the operating system 108 to enumerate or list the window handles according to the Z-order.

Next, in step S33, it is determined whether the listing of the window handles is finished. When the listing of the window handles is not finished (NO in step S33), the input allocating section 106 repeats sequential steps S34 to S37. When the listing of the window handles is finished (YES in step S33), the control flow proceeds to step S38 in which the input allocating section 106 updates the transparent operation surface list 402 shown in FIG. 5C. Then, the input allocating section 106 terminates the processing for the Z-order change event. Detailed processing of step S38 will be described later with reference to the flowchart of FIG. 7.

In step S34, the input allocating section 106 receives a window handle "hWnd" from the operating system 108. Then, the control flow proceeds to step S35 in which the input allocating section 106 obtains a displayed state of a window having the window handle. Next, in step S36, it is determined whether the window is currently displayed. When the window is not currently displayed (i.e., NO in step S36), the control flow returns to step S33 to repeat the above-described processes. When the window is currently displayed (i.e., YES in step S36), the control flow proceeds to step S37 in which the input allocating section 106 adds the window handle "hWnd" to the last of the Z-order list 401. Then, the control flow returns to step S33.

Figure 7:
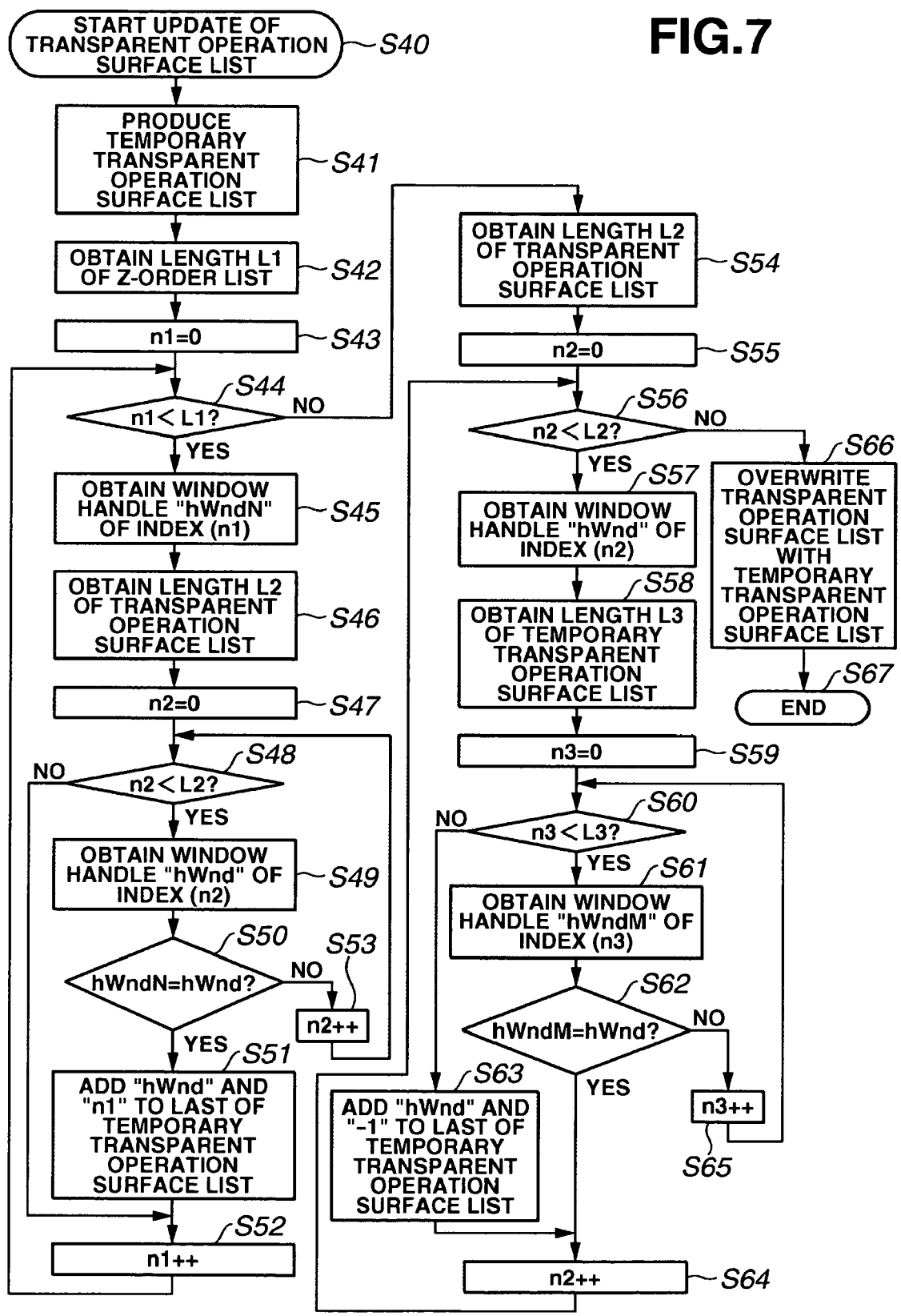
FIG. 7 is a flowchart showing an operation of the input allocating section that updates the transparent operation surface list in accordance with the first embodiment of the present invention.

FIG. 7 is a flowchart showing an operation of the input allocating section 106 that updates the transparent operation surface list 402 (FIG. 5C), corresponding to the processing of step S38 shown in FIG. 6, in accordance with the present embodiment. Program for the processing is loaded to RAM 202 and executed under control of CPU 201.

The transparent operation surface list 402 is updated when the Z-order is changed or in response to a register/deletion request of a window handle if the operation control section 107 sends such a request to the transparent operation surface list 402. When a register request of a window handle is generated from the operation control section 107 to the transparent operation surface list 402, a value "−1" of the Z-order index is added to the transparent operation surface list 402 before updating the transparent operation surface list 402. The value "−1" of the Z-order index indicates that both the window handle and the window are not displayed. Furthermore, when a deletion request of a window handle is generated, the window handle is deleted beforehand from the transparent operation surface list 402. Details will be described in the following.

First, in step S40, the input allocating section 106 starts updating the/transparent operation surface list 402. Then, the control flow proceeds to step S41 in which the input allocating section 106 produces a temporary transparent operation surface list in RAM 202. Next, in steps S42 through S53, the input allocating section 106 determines whether the transparent operation surface list 402 includes a window handle contained in the Z-order list 401. When the window handle is contained, the input allocating section 106 adds the window handle and its Z-order index to the temporary transparent operation surface list (in other words, produced in RAM 202).

First in step S42, the input allocating section 106 obtains a length L1 (i.e., total index number) of the Z-order list 401. Then, in step S43, the input allocating section 106 initializes the index n1 to 0. Next, in step S44, it is determined whether the index n1 is smaller than length L1. More specifically, the input allocating section 106 checks whether all of indexes in the Z-order list 401 have been inspected. When the index n1 is not smaller than length L1 (i.e., NO in step S44), it means that inspection about all indexes in the Z-order list 401 is already finished. Thus, the control flow proceeds to step S54.

When the index n1 is smaller than length L1 (i.e., YES in step S44), the control flow proceeds to step S45 in which the input allocating section 106 obtains a window handle "hWndN" of Index (n1) from the Z-order list 401. Next, in step S46, the input allocating section 106 obtains a length L2 (i.e. total index number) of the transparent operation surface list 402. Next, in step S47, the input allocating section 106 initializes the index n2 to 0.

Then, in step S48, it is determined whether the index n2 is smaller than length L2. When the index n2 is not smaller than length L2 (i.e., NO in step S48), the control flow proceeds to step S52 to count up the index n1, after which the control flow returns to step S44. When the index n2 is smaller than length L2 (i.e., YES in step S48), the control flow proceeds to step S49 in which the input allocating section 106 obtains a window handle "hWnd" of Index (n2) from the transparent operation surface list 402.

Next, the control flow proceeds to step S50 to compare the window handle "hWndN" of the Z-order list 401 obtained in step S45 with the window handle "hWnd" of the transparent operation surface list 402 obtained in step S49. When the window handle "hWndN" is not equal to the window handle "hWnd" (i.e., NO in step S50), the control flow proceeds to step S53 to count up (by +1) the index n2, after which the control flow returns to step S48 to repeat the above-described processes. When the window handle "hWndN" is equal to the window handle "hWnd" (i.e., YES in step S50), the control flow proceeds to step S51 in which the input allocating section 106 adds the window handle "hWnd" and the index n1 to the last of the temporary transparent operation surface list. Then, the control flow proceeds to step S52 to count up the index n1, after which the control flow returns to step S44.

Returning to step S44, when the index n1 is not smaller than length L1 (i.e., NO in step S44), the input allocating section 106 executes steps S54 through S65. Through these steps, the input allocating section 106 determines whether the temporary transparent operation surface list includes a window handle contained in the transparent operation surface list 402. When the window handle is not contained, a value "−1" of the Z-order index is added to the temporary transparent operation surface list. The value "−1" of the Z-order index indicates that the window handle and the window are not displayed. Details will be described in the following.

First, in step S54, the input allocating section 106 obtains a length L2 of the transparent operation surface list 402. Then, the control flow proceeds to step S55 to initialize the index n2 to 0. Then, in step S56, it is determined whether the index n2 is smaller than length L2. More specifically, the input allocating section 106 determines whether all items on the transparent operation surface list 402 are checked. When the index n2 is not smaller than length L2 (i.e., NO in step S56), the control flow proceeds to step S66.

When the index n2 is smaller than length L2 (i.e., YES in step S56), the control flow proceeds to step S57 in which the input allocating section 106 obtains a window handle "hWnd" of Index (n2) from the transparent operation surface list 402. Next, in step S58, the input allocating section 106 obtains a length L3 of the temporary transparent operation surface list. Then, in step S59, the index n3 is initialized to 0. Next, in step S60, it is determined whether the index n3 is smaller than length L3.

When the index n3 is smaller than length L3 (i.e., YES in step S60), the control flow proceeds to step S61 in which the input allocating section 106 obtains a window handle "hWndM" of the Index (n3) from the temporary transparent operation surface list. Next, in step S62, it is determined whether the window handle "hWndM" is equal to "hWnd". When "hWndM" is equal to "hWnd" (i.e., YES in step S62), the control flow proceeds to step S64 to count up the index n2, after which the control flow returns to step S56 to execute the above-described processes. When "hWndM" is not equal to "hWnd" (i.e., NO in step S62), the control flow proceeds to step S65 to count up the index n3, after which the control flow returns to step S60.

When the index n3 is not smaller than length L3 (i.e., NO in step 60), the control flow proceeds to step S63 in which the input allocating section 106 adds the window handle "hWnd" and value "−1" to the last of the temporary transparent operation surface list. The value "−1" indicates that the Z-order index is unknown. Then, the control flow proceeds to step S64 to count up the index n2, after which the control flow returns to step S56. When the index n2 is not smaller than length L2 (i.e., NO in step S56), the control flow proceeds to step S66 in which the input allocating section 106 overwrites the transparent operation surface list 402 with the temporary transparent operation surface list. Then, in step S67, the input allocating section 106 terminates the processing.

Figure 8:
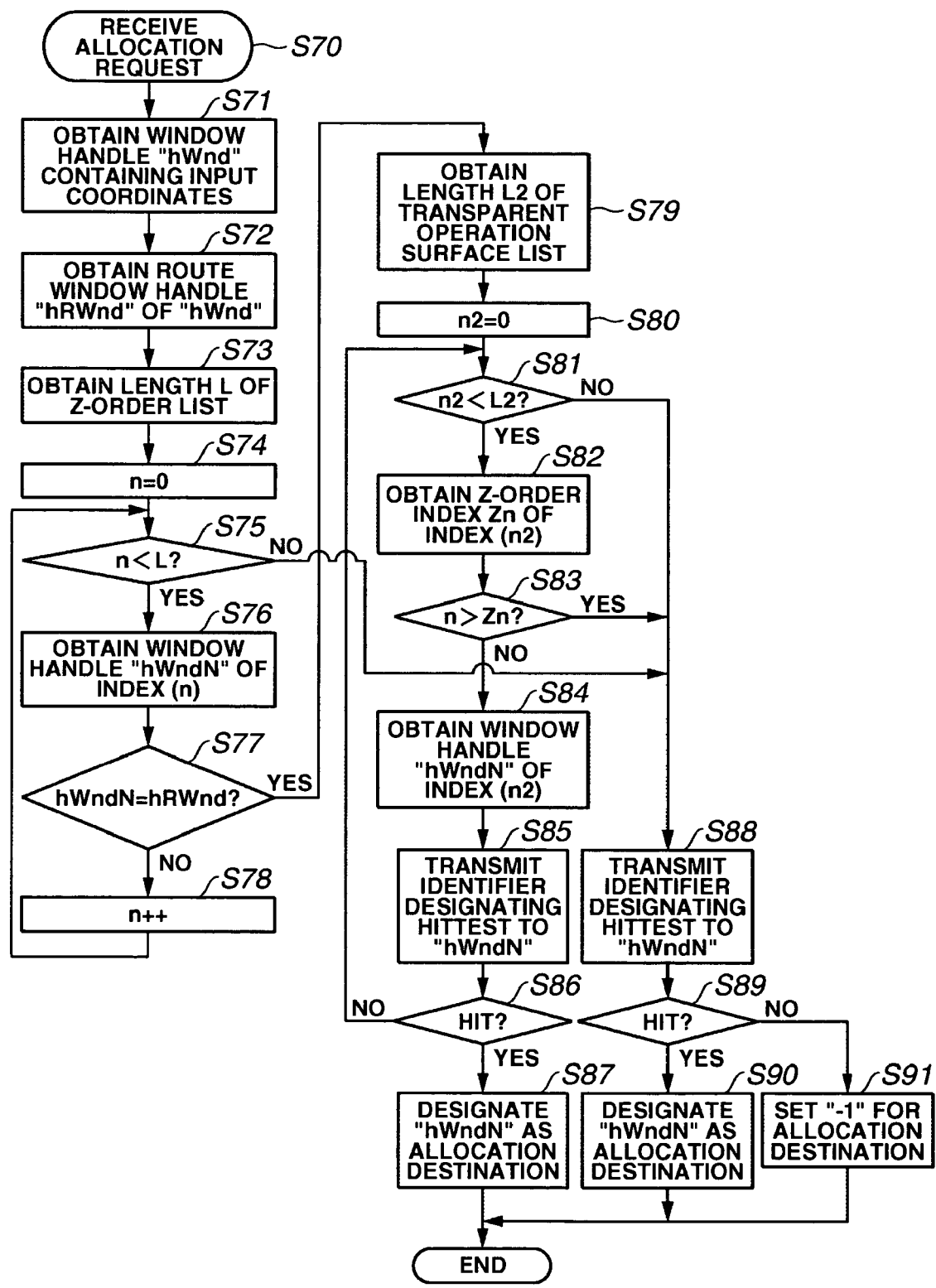
FIG. 8 is a flowchart showing an operation of the input allocating section performed in response to an allocation destination determining request from the input control section in accordance with the first embodiment of the present embodiment.

FIG. 8 is a flowchart showing an operation of the input allocating section 106 performed in response to an allocation destination judging request from the input control section 104 in accordance with the present embodiment. Program for the processing is loaded to RAM 202 and is executed under control of CPU 201.

First, in step S70, the input allocating section 106 starts the processing for allocating the data in response to entry of an allocation destination request. Then, in step S71, the input allocating section 106 obtains, from the operating system 108, a window handle "hWnd" of a frontmost window (i.e., a window positioned at the near side on the screen) that includes coordinates indicated by the input coordinate data. Next, in step S72, the input allocating section 106 obtains, from the operating system 108, a handle "hRWnd" of a root window (corresponding to a parent window of the window handle "hWnd")

The present embodiment requires accessing the operating system 108 to execute the above-described steps S71 and S72. However, if the Z-order list 401 additionally includes the position and size of each window and a handle of its root window, the input allocating section 106 can independently search a window handle containing the input coordinates and/or search its root window without relying on the operating system 108. Then, in steps S73 through S78, the input allocating section 106 compares the handle "hRWnd" of the root window with the window handle "hWnd" of the Z-order list 401 to obtain a Z-order index. In case of failure in obtaining the Z-order index, the control flow proceeds to step S88. Details will be described in the following.

In step S73, the input allocating section 106 obtains a length L of the Z-order list 401. Next, in step S74, the index n is initialized to 0. Next, in step S75, it is determined whether the index n is smaller than length L. When the index n is not smaller than length L (i.e., NO in step S75), the control flow proceeds to step S88. When the index n is smaller than length L (i.e., YES in step S75), the control flow proceeds to step S76 in which the input allocating section 106 obtains a window handle "hWndN" of Index (n) from the Z-order list 401.

Next, in step S77, the window handle "hWndN" is compared with the handle "hRWnd" of the root window. When "hWndN" is equal to "hRWnd" (i.e., YES in step S77), the control flow proceeds to step S79. When "hWndN" is not equal to "hRWnd" (i.e., NO in step S77), the control flow proceeds to step S78 to count up the index n, after which the control flow returns to step S75. In step S79, the input allocating section 106 obtains a length L2 of the transparent operation surface list 402. Next, in step S80, the index n2 is initialized to 0.

Next, in step S81, it is determined whether the index n2 is smaller than length L2. When the index n2 is not smaller than length L2 (i.e., NO in step S81), the control flow proceeds to step S88. When the index n2 is smaller than length L2 (i.e., YES in step S81), the control flow proceeds to step S82 in which the input allocating section 106 obtains a Z-order index Zn of Index (n2) from the transparent operation surface list 402. Next, in step S83, it is determined whether the index n is greater than Zn.

When the index n is greater than Zn (i.e., YES in step S83), the control flow proceeds to step S88. When the index n is not greater than Zn (i.e., NO in step S83), the control flow proceeds to step S84 in which the input allocating section1 106 obtains a window handle "hWndN" of Index (n2) from the transparent operation surface list 402. Next, in step S85, the input allocating section 106 transmits a HITTEST message to the window handle "hWndN". The HITTEST message designates an identifier of input data and the coordinate values.

When the operation control section 107 receives the HITTEST message designating the identifier of input data and the coordinate values, the operation control section 107 returns HIT if the conditions for accepting input from the corresponding identifier are satisfied and the coordinate values are within its window. Otherwise, the operation control section 107 returns NOTHIT. When the coordinate values agree with the coordinates within the window of the window handle "hWndN", an application corresponding to the window handle "hWndN" notifies HIT. On the contrary, when coordinate values disagree with the coordinates within the window of the window handle "hWndN", an application corresponding to the window handle "hWndN" notifies NOTHIT.

In step S86, the input allocating section 106 confirms a returned result of the message. When the returned result is not HIT (i.e., NO in step S86), the control flow returns to step S81. When the returned result is HIT (i.e., YES in step S86), the control flow proceeds to step S87 in which the input allocating section 106 designates "hWndN" as an allocation destination. Then, the input allocating section 106 terminates the processing.

In step S88, the input allocating section 106 transmits a HITTEST message to the window handle "hWndN". The HITTEST message designates an identifier. Next, in step S89, it is determined whether a result returned from the window handle "hWndN" is HIT. When the returned result is HIT (i.e., YES in step S89), the control flow proceeds to step S90 in which the input allocating section 106 designates the operation surface "hWndN" (i.e. an object being HIT) as an allocation destination. Then, the input allocating section 106 terminates the processing that responds to an allocation request. On the other hand, when the returned result is not HIT (i.e., NO in step S89), the control flow proceeds to step S91 to set a value "−1" that indicates designating other application 109 as an allocation destination. Then, the input allocating section 106 terminates the processing.

The input allocating section 106 may manage the Z-order list 401 to include a window handle of the operation control section 107 that obtains a mouse event, although transparent, depending on coordinate data contained in the window region. In such a case, the processing in step S88 can be replaced with a judgment for checking the presence of a window handle "hWnd" on the Z-order list 401.

Figure 9:
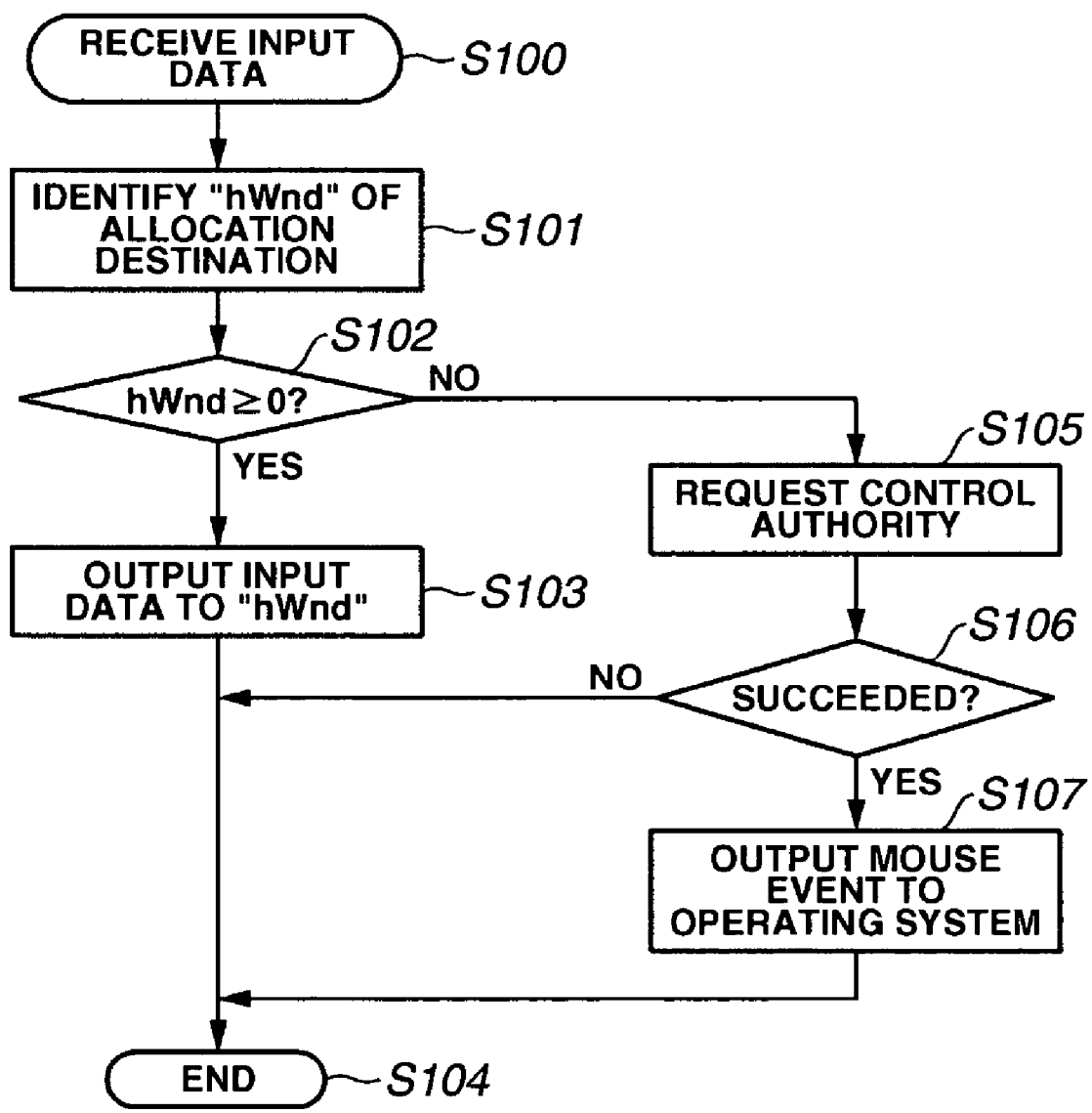
FIG. 9 is a flowchart showing an operation of the input control section performed in response to input of data in accordance with the first embodiment of the present embodiment.

FIG. 9 is a flowchart showing an operation of the input control section 104 performed in response to input of data from the coordinate input apparatus 102 in accordance with the present embodiment. Program for the processing is loaded to RAM 202 and is executed under control of CPU 201.

First, in step S100, the input control section 104 receives input data. Then, the control flow proceeds to step S101, in which the input control section 104 identifies a window handle "hWnd" of the allocation destination by accessing the input allocating section 106 (refer to FIG. 8). Then, in step S102, it is determined whether the window handle "hWnd" of the allocation destination is the operation control section 107 (refer to S87 or S90 in FIG. 8) or whether the value "−1" designating other application 109 is set (refer to step S91 in FIG. 8). When the window handle "hWnd" is the operation control section 107 (i.e., when "hWnd" is greater than 0 in step S102), the control flow proceeds to step S103.

In step S103, the input control section 104 outputs the input data of step S100 to the window handle "hWnd". Then, in step S104, the input control section 104 terminates the processing for the input data. When the window handle "hWnd" is not the operation control section 107 (i.e., when "hWnd" is less than 0 in step S102), the control flow proceeds to step S105, in which the input control section 104 requests control authority for input data by accessing the control authority managing section 105 (refer to FIG. 3). The flowchart of FIG. 3 should be referred to regarding details of the processing in step S105.

Next, the control flow proceeds to step S106 in which the input control section 104 confirms an obtained result with respect to the control authority. When no control authority is obtained (i.e., NO in step S106), the control flow proceeds to step S104 to terminate the processing. When the control authority is obtained (i.e., YES in step S106), the control flow proceeds to step S107 in which the input control section 104 outputs a mouse event to the operating system 108 before terminating the processing.

Figures 10, 11:
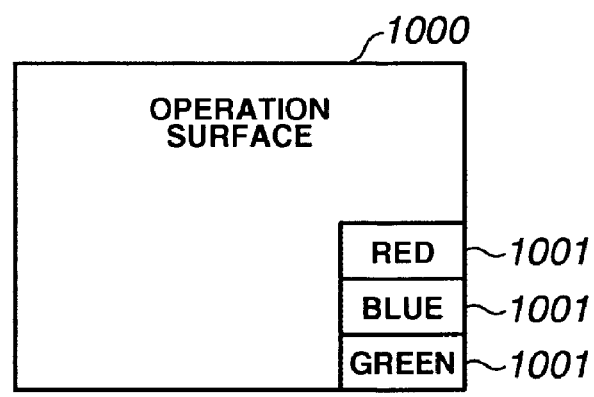
FIG. 10 is a view showing one example of an operation management list managed by an operation control section in accordance with the first embodiment of the present embodiment.
FIG. 11 is a view showing one example of an operation surface managed by the operation control section that has the management function shown in FIG. 10.

FIG. 10 shows one example of an operation management list managed by the operation control section 107 in accordance with the present embodiment. According to the example, for the purpose of simplifying the explanation, the function of the operation control section 107 is limited to plotting a free line that is changeable only in color.

An operation management list 900 stores, for each index (Index), data of Identifier, Drag flag, Previous coordinates, and Plotting color. The Drag flag shows the state of a drag operation. The operation management list 900, if data relating to thickness and/or figure type are further included, can realize the operation control section 107 of a vector graphic editor type that allows simultaneous use by a plurality of users.

According to the example, a coordinate pointer having an identifier "0" is currently in a drag operation. The previous coordinate values are (10, 50). And, the plotting color based on the coordinate values is set to Black. Similarly, a coordinate pointer having an identifier "1" is not in a button down state. The previous coordinate values are (0, 0). And, the plotting color based on the coordinate values is set to Green. Furthermore, a coordinate pointer having an identifier "2" is not in a button down state. The previous coordinate values are (0, 0). And, the plotting color based on the coordinate values is set to Red.

FIG. 11 is a view showing one example of an operation surface managed by the operation control section 107 that has the above-described management function shown in FIG. 10. An operation surface 1000 is displayed on the common screen display apparatus 101. Operation buttons 1001 are disposed along an edge of the operation surface 1000. Although the operation buttons 1001 are located within the operation surface 1000, the present invention is not limited to the example. Therefore, the buttons 1001 can be disposed outside the operation surface 1000 to instruct change of plotting color to the operation control section 107. Furthermore, the operation buttons 1001 can be provided in the input section 207 of FIG. 2 or in the plural coordinates input apparatus 102 of FIG. 1.

Figure 12:
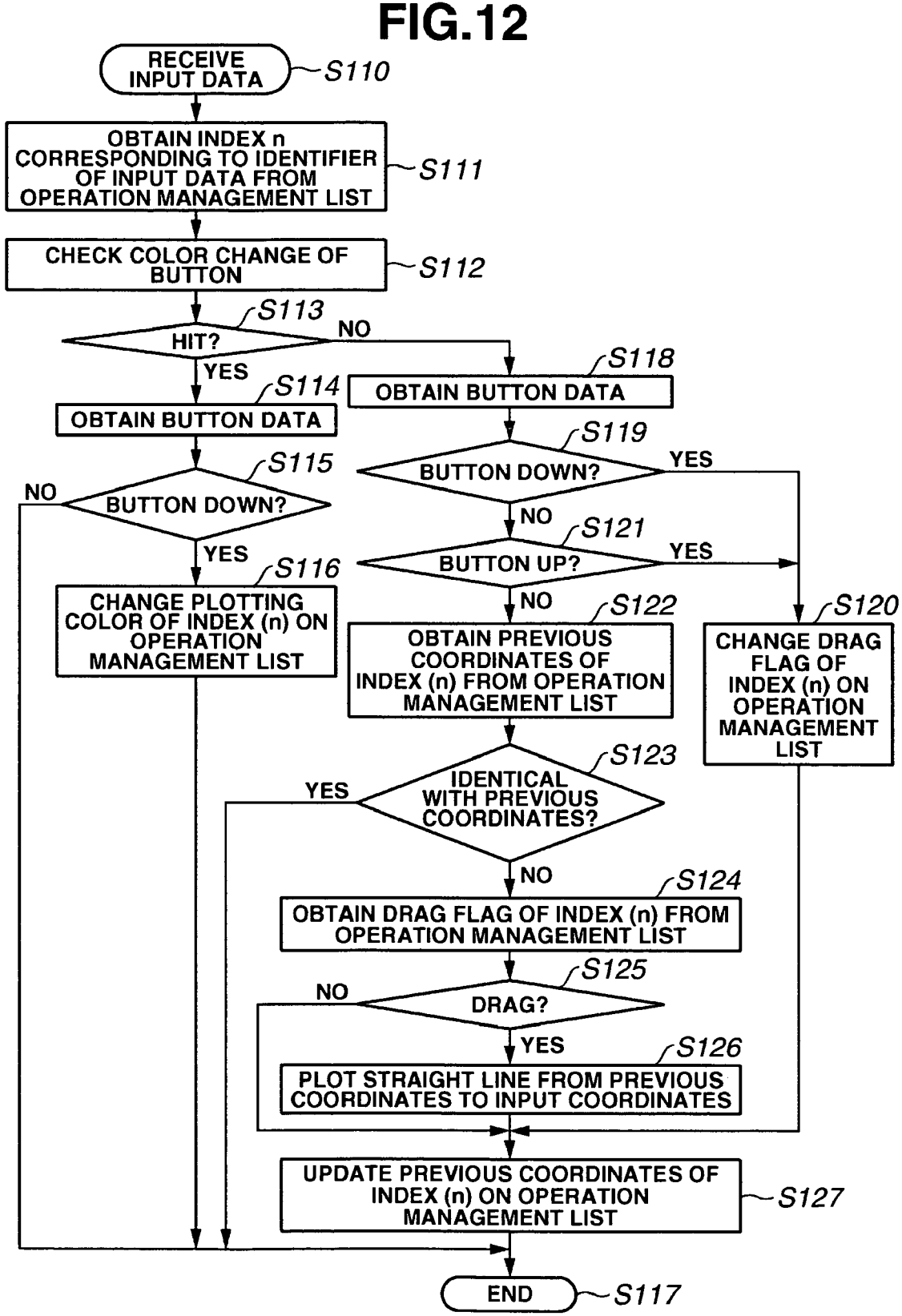
FIG. 12 is a flowchart showing the processing of input data in the operation control section that has the capability of plotting a free line which is changeable only in color.

FIG. 12 is a flowchart showing the processing of input data in the operation control section 107 that has the capability of plotting a free line which is changeable only in color. Program for the processing is loaded to RAM 202 and is executed under control of CPU 201.

First, in step S110, the operation control section 107 receives data. Then, in step S111, the operation control section 107 obtains an index n corresponding to the identifier of input data from the operation management list 900 (FIG. 10). Next, in step S112, the operation control section 107 performs "HITTEST" (i.e., a judgment for checking the presence of any pointed operation button 1001 shown in FIG. 11). Next, in step S113, it is determined whether the returned result is HIT (i.e., whether or not any operation button 1001 is pointed).

When the returned result is HIT (i.e., YES in step S113), or more specifically, when any operation button 1001 is selected, the control flow proceeds to step S114 in which the operation control section 107 obtains button data of input data received in the step S110. Next, in step S115, the operation control section 107 judges the presence of Button Down. When the button data is not Button Down (i.e., NO in step S115), the control flow proceeds to step S117 to terminate the processing.

When the button data is Button Down (i.e., YES in step S115), the control flow proceeds to step S116 in which the operation control section 107 changes the plotting color of Index (n) on the operation management list 900 in accordance with the operation button 1001 being Button Down. Then, in step S117, the operation control section 107 terminates the processing.

When the returned result is not HIT (i.e., NO in step S113), the control flow proceeds to step S118 in which the operation control section 107 obtains button data of input data. Next, in step S119, it is determined whether the button data is Button Down. When the button data is Button Down (i.e., YES in step S119), the control flow proceeds to step S120 in which the operation control section 107 changes the drag flag of Index (n) to "TRUE" on the operation management list 900, wherein "TRUE" indicates that a drag operation is currently performed. Then, in step S127, the operation control section 107 replaces the previous input coordinate values with present input coordinate values before terminating the processing.

When the button data is not Button Down (i.e., NO in step S119), the control flow proceeds to step S121 to further determine whether the button data is Button Up. When the button data is Button Up (i.e., YES in step S121), the control flow proceeds to step S120 in which the operation control section 107 changes the drag flag of Index (n) to "FALSE" on the operation management list 900, wherein "FALSE" indicates that the drag operation is not currently performed. Then, in step S127, the operation control section 107 replaces the previous input coordinate values with the present input coordinate values before terminating the processing.

When the button data is not Button Up (i.e., NO in step S121), the control flow proceeds to step S122 in which the operation control section 107 obtains the previous coordinate values of Index (n) from the operation management list 900. Next, in step S123, the present input coordinate values are compared with the previous input coordinate values obtained in step S122. When the present input coordinate values are identical with the previous input coordinate values (i.e., YES in step S123), the control flow proceeds to step S117 to terminate the processing.

When the present input coordinate values are not identical with the previous input coordinate values (i.e., NO in step S123), the control flow proceeds to step S124 in which the operation control section 107 obtains a drag flag of the index from the operation management list 900. Then, in step S125, it is determined whether any drag operation is currently performed. When no drag operation is performed (i.e., NO in step S125), the control flow proceeds to step S127 in which the operation control section 107 replaces the previous input coordinate values of Index (n) on the operation management list 900 with the present input coordinate values before terminating the processing.

When any drag operation is performed (i.e., YES in step S125), the control flow proceeds to step S126 in which the operation control section 107 plots a straight line from the previous coordinates to the present input coordinates. Then, the control flow proceeds to step S127 in which the operation control section 107 replaces the previous input coordinate values of Index (n) on the operation management list 900 with the present input coordinate values before terminating the processing.

Figure 13:
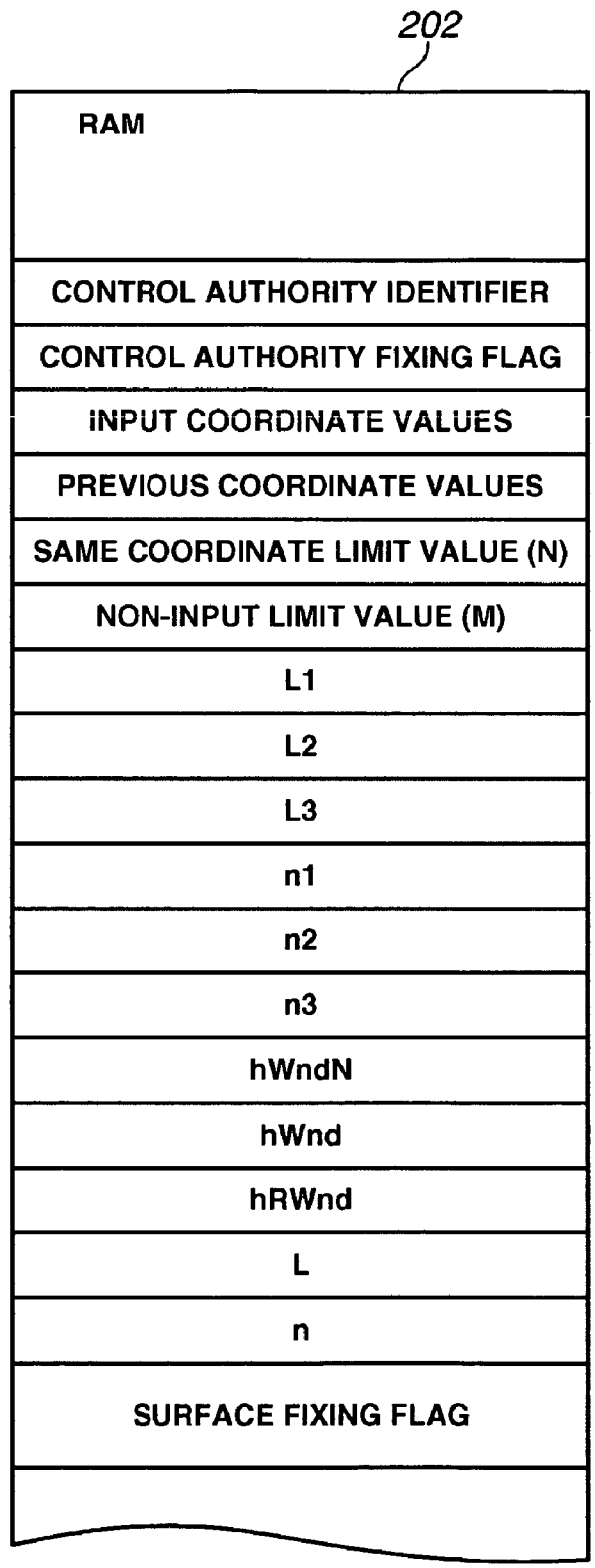
FIG. 13 is a view showing a memory map including variables and flags stored in RAM in accordance with the first embodiment of the present invention.

FIG. 13 is a view showing a memory map including variables and flags stored in RAM 202 in accordance with the first embodiment.

Second Embodiment

Figure 14:
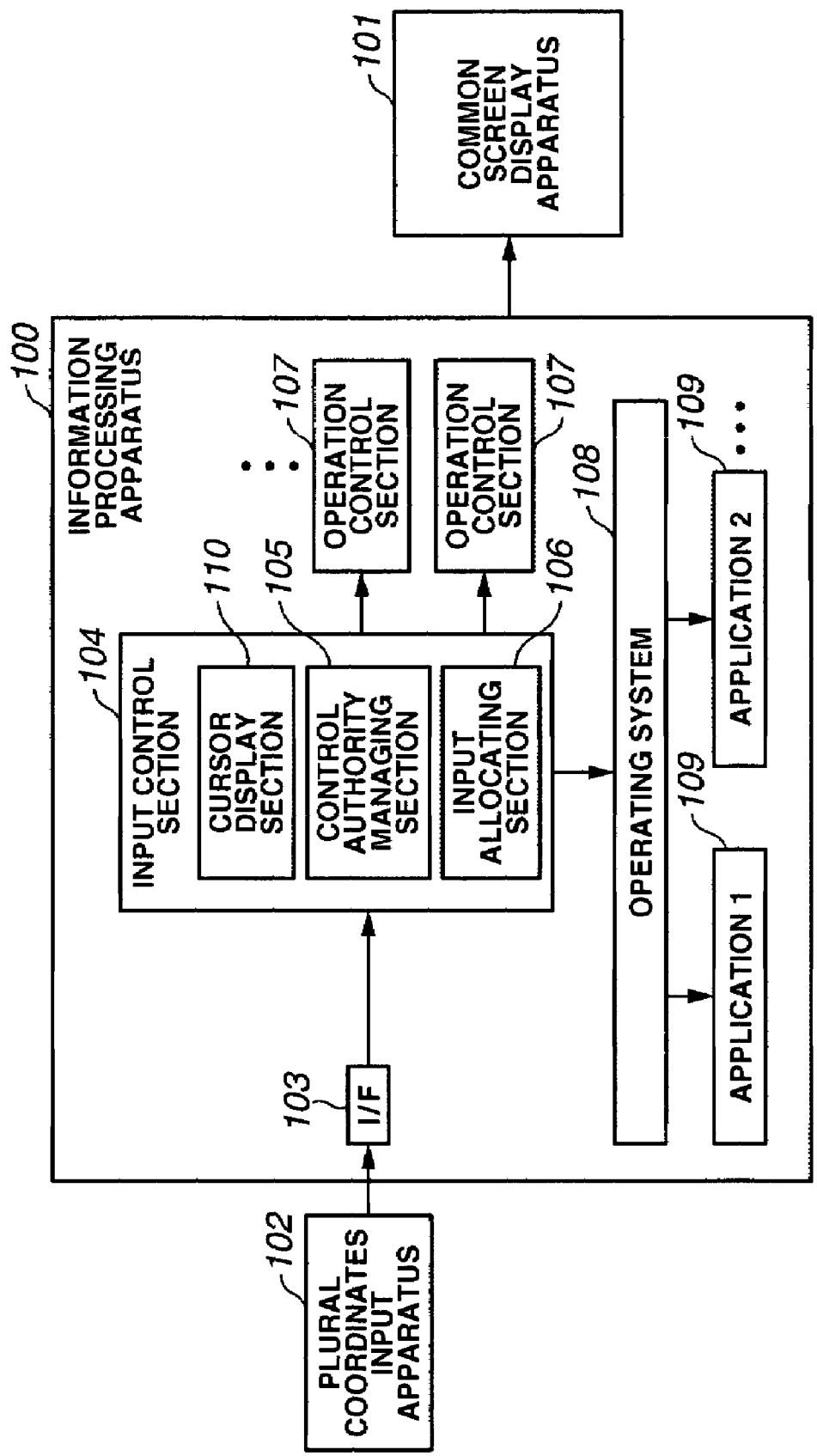
FIG. 14 is a block diagram showing a functional arrangement of a cooperative work supporting system in accordance with a second embodiment of the present invention.

FIG. 14 is a block diagram showing a functional arrangement of a cooperative work supporting system in accordance with a second embodiment of the present invention. Portions or components identical with or common to those described in the first embodiment are denoted by the same reference numerals shown in FIG. 1 and will not be described in the following.

An information processing apparatus 100 of the second embodiment is the same in hardware arrangement as the first embodiment and accordingly will not be described in the following. The second embodiment is different from the first embodiment in that a cursor display section 110 is additionally provided.

The cursor display section 110 has a pseudo cursor for each identifier and displays the pseudo cursor on the coordinates entered from the plural coordinates input apparatus 102 to notify a user of the position of input coordinates. According to the second embodiment, a tablet or a mouse which is not used in performing input in the common screen display apparatus 101 is available as the plural coordinates input apparatus 102.

Figure 15:
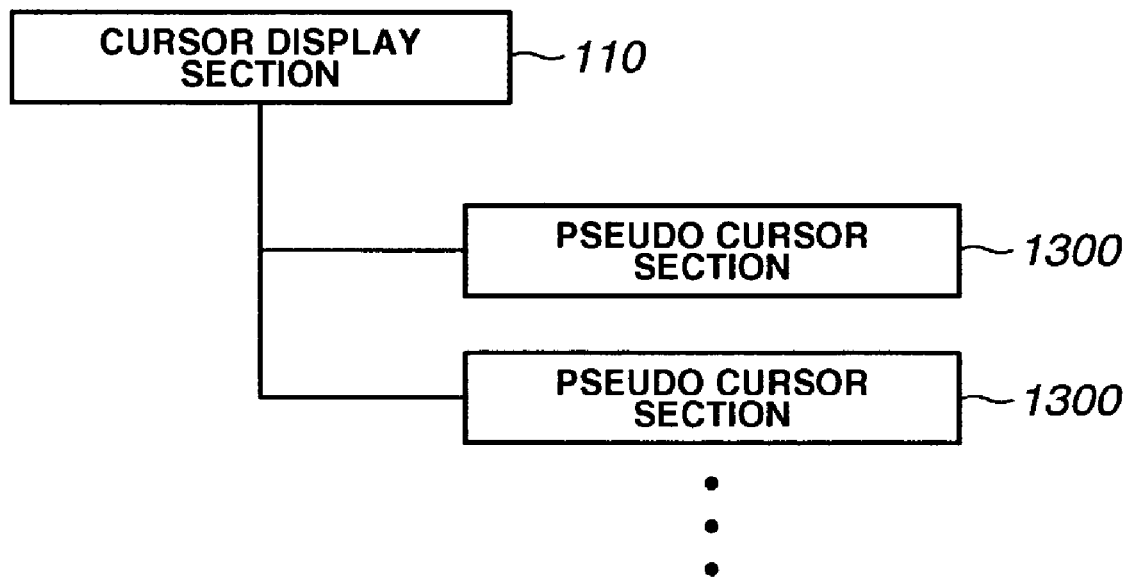
FIG. 15 is a block diagram showing a functional arrangement of a cursor display section in accordance with the second embodiment of the present invention.

FIG. 15 shows a functional arrangement of the cursor display section 110 in accordance with the second embodiment. The cursor display section 110 has a plurality of pseudo cursor sections 1300 corresponding to respective identifiers. The cursor display section 110, in response to data received from the input control section 104, generates an output to a pseudo cursor section corresponding to the identifier of the data. Controlling display and/or non-display of a pseudo cursor in the pseudo cursor section 1300 should be performed in the same manner as in the control of an automatic release mode and/or a fixed mode of the control authority in the control authority managing section 105.

Namely, an automatic non-display mode and a fixed display mode are provided. The automatic non-display mode is for automatically switching the display into a non displayed state when a predetermined time has passed. The fixed display mode is for maintaining a displayed state. If such a control is not used, many pseudo cursors of respective identifiers will be continuously displayed on a screen and accordingly it will be difficult to identify a target pseudo cursor when data is input from the plural coordinates input apparatus 102.

Figure 16:
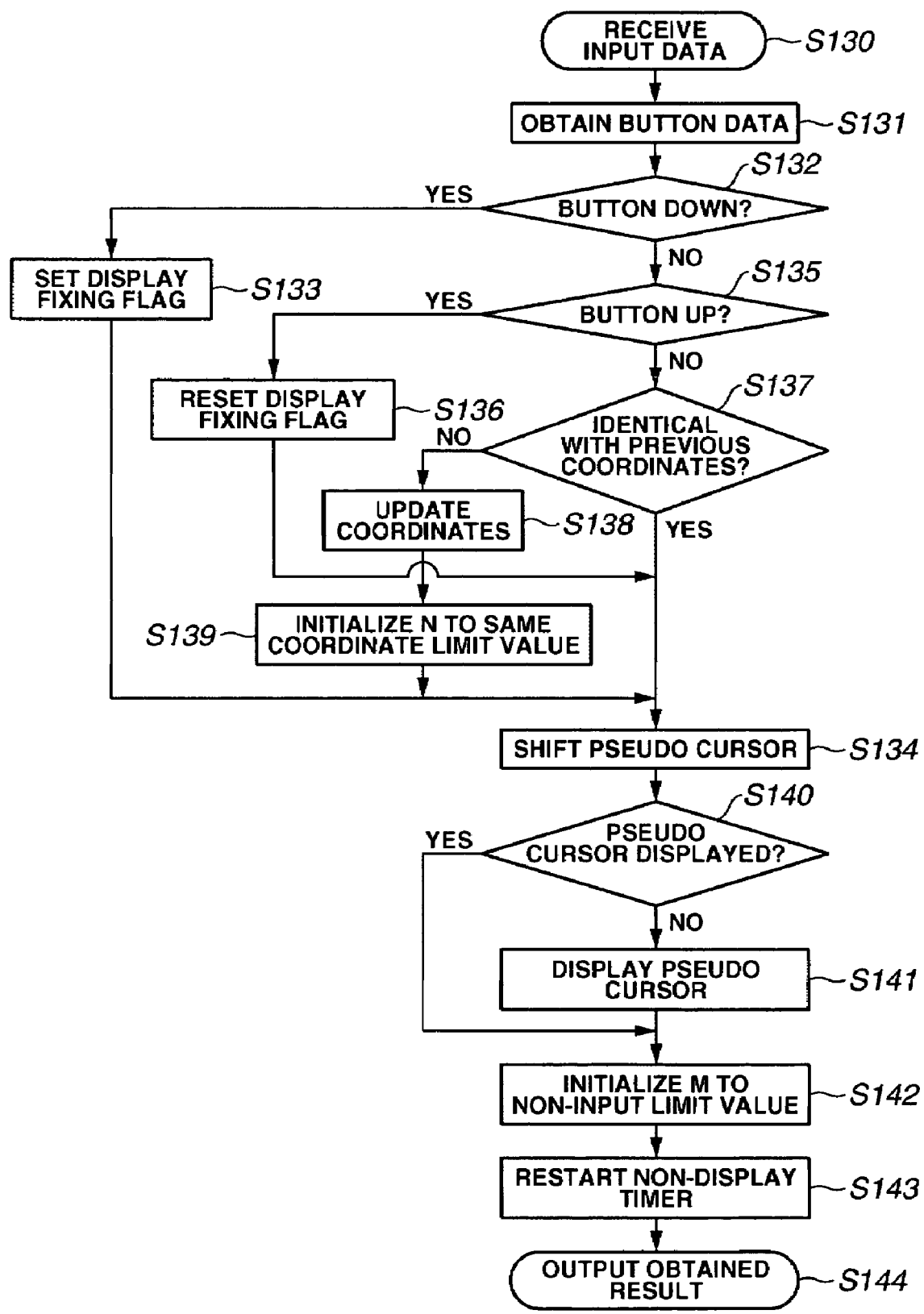
FIG. 16 is a flowchart showing an operation of the pseudo cursor section performed in response to a request from the cursor display section in accordance with the second embodiment of the present invention.

FIG. 16 is a flowchart showing an operation of the pseudo cursor section 1300 performed in response to a request from the cursor display section 110 in accordance with the second embodiment. Program for the processing is loaded to RAM 202 and is executed under control of CPU 201.

First, in step S130, the pseudo cursor section 1300 receives data from the cursor display section 110. Then, the control flow proceeds to step S131 in which the pseudo cursor section 1300 obtains button data from the input data. Next, in step S132, it is determined whether the button data is Button Down. When the button data is Button Down (i.e., YES in step S132), the control flow proceeds to step S133 in which the pseudo cursor section 1300 sets a display fixing flag to ON. The pseudo cursor section 1300 holds the display fixing flag. Then, the control flow proceeds to step S134.

When the button data is not Button Down (i.e., NO in step S132), the control flow proceeds to step S135 to further determine whether the button data is Button Up. When the button data is Button Up (i.e., YES in step S135), the control flow proceeds to step S136 in which the pseudo cursor section 1300 resets the display fixing flag to OFF, and then proceeds to step S134. When the button data is not Button Up (i.e., NO in step S135), the control flow proceeds to step S137 to further determine whether the coordinates of input data are identical with the previous input coordinate values held by the pseudo cursor section 1300.

When the coordinates of input data are not identical with the previous input coordinate values (i.e., NO in step S137), the control flow proceeds to step S138 in which the pseudo cursor section 1300 updates the previous input coordinate values. Next, in step S139, the pseudo cursor section 1300 initializes a value N to a same coordinate limit value Nb, wherein the value N is for counting continuous inputs of coordinate values identical with those held in the pseudo cursor section 1300. Then, the control flow proceeds to step S134.

Furthermore, when the coordinates of input data are identical with the previous input coordinate values (i.e., YES in step S137), the control flow proceeds to step S134. In step S134, the pseudo cursor section 1300 shifts a pseudo cursor to the coordinates of input data. Next, in step S140, it is determined whether the pseudo cursor is displayed. When the pseudo cursor is currently displayed (i.e., YES in step S140), the control flow proceeds to step S142. When the pseudo cursor is not displayed (i.e., NO in step S140), the control flow proceeds to step S141 in which the pseudo cursor section 1300 displays a pseudo cursor. Then, the control flow proceeds to step S142.

In step S142, the pseudo cursor section 1300 initializes a value M to a non-input limit value Mb, wherein the value M is for counting continuous inputs not accompanied with the coordinate values held in the pseudo cursor section 1300. Then, in step S143, the pseudo cursor section 1300 initializes and restarts a non-display timer. Next, in step S144, the pseudo cursor section 1300 terminates the processing for shifting a pseudo cursor. The non-display timer issues a timeout event every time a predetermined time has passed. Upon restarting, the timer value is reset to a predetermined value.

Figure 17:
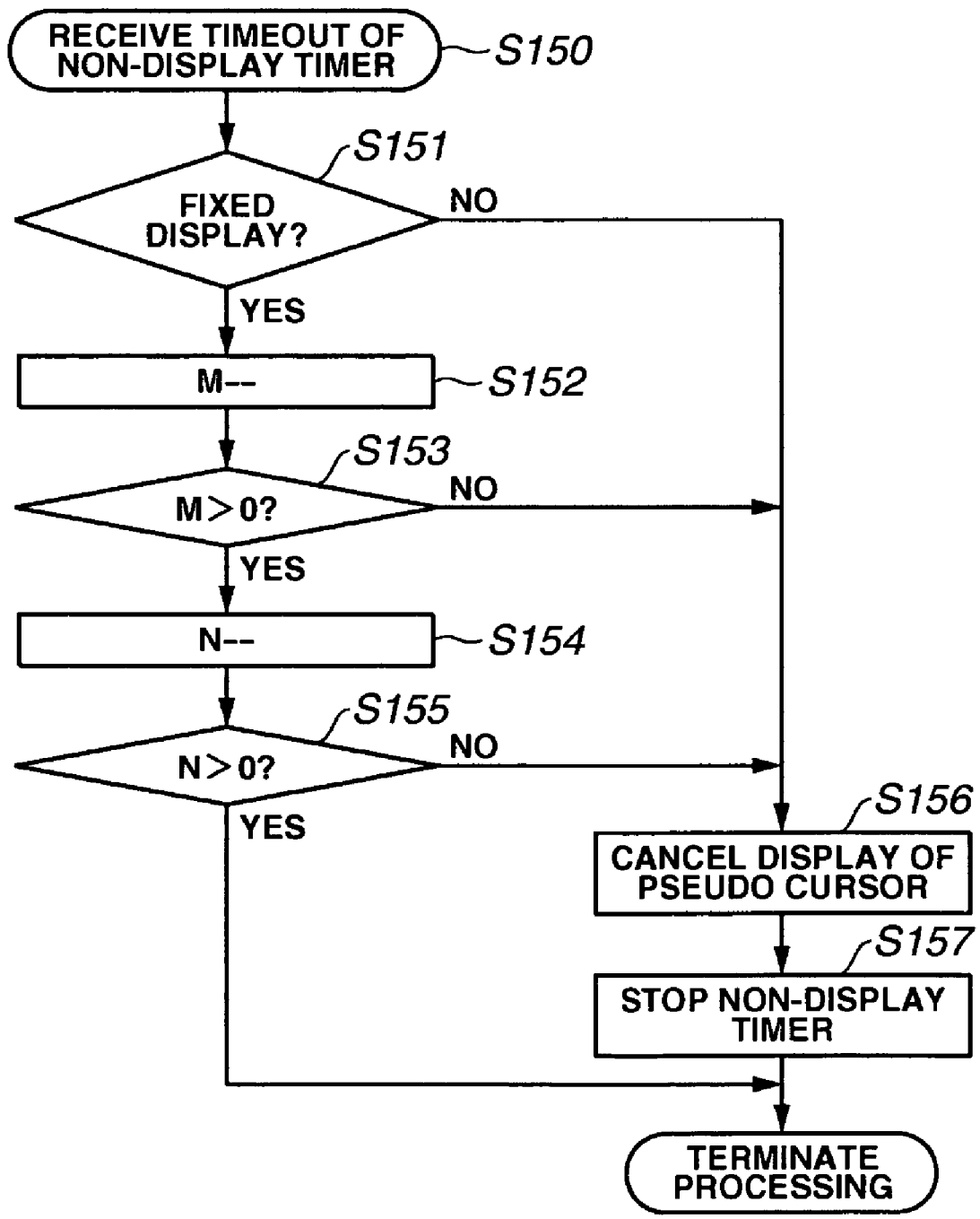
FIG. 17 is a flowchart showing an operation of the pseudo cursor section performed upon timeout of a non-display timer in accordance with the second embodiment of the present invention.

FIG. 17 is a flowchart showing an operation of the pseudo cursor section 1300 performed upon timeout of the non-display timer in accordance with the second embodiment. Program for the processing is loaded to RAM 202 and executed under control of CPU 201.

First, in step S150, the non-display timer reaches timeout. Then, in step S151, the pseudo cursor section 1300 checks the display fixing flag. When the display fixing flag is OFF, or more specifically, when the display is not fixed (i.e., NO in step S151), the control flow proceeds to step S156 to bring a pseudo cursor into a non-displayed state. Next, in step S157, the non-display timer is stopped before terminating the non-display timer timeout processing.

When the display fixing flag is ON (i.e., YES in step S151), the control flow proceeds to step S152 to decrement the value M (M=M−1), wherein M represents a value for counting continuous inputs not accompanied with coordinate values. Next, in step S153, it is determined whether the value M is greater than 0. When the value M is not greater than 0 (i.e., NO in step S153), it is presumed that a device is in a damaged or malfunctioned state with a pseudo cursor being continuously displayed and therefore no response is returned from the device. Thus, the control flow proceeds to step S156 to bring a pseudo cursor into a non-displayed state.

When the value M is greater than 0 (i.e., YES in step S153), the control flow proceeds to step S154 to decrement the value N (i.e., N=N−1), wherein N represents a value for counting continuous inputs of the same coordinate values. Then, in step S155, it is determined whether the value N is greater than 0. When the value N is not greater than 0 (i.e., NO in step S155), it is presumed that data is continuously input, although a user does not intend for this to occur. Thus, the control flow proceeds to step S156 in which the pseudo cursor section 1300 executes the non-display processing of a pseudo cursor. When the value N is greater than 0 (i.e., YES in step S155), the pseudo cursor section 1300 terminates the timeout processing of non-display timer without changing a displayed state.

Figure 18:
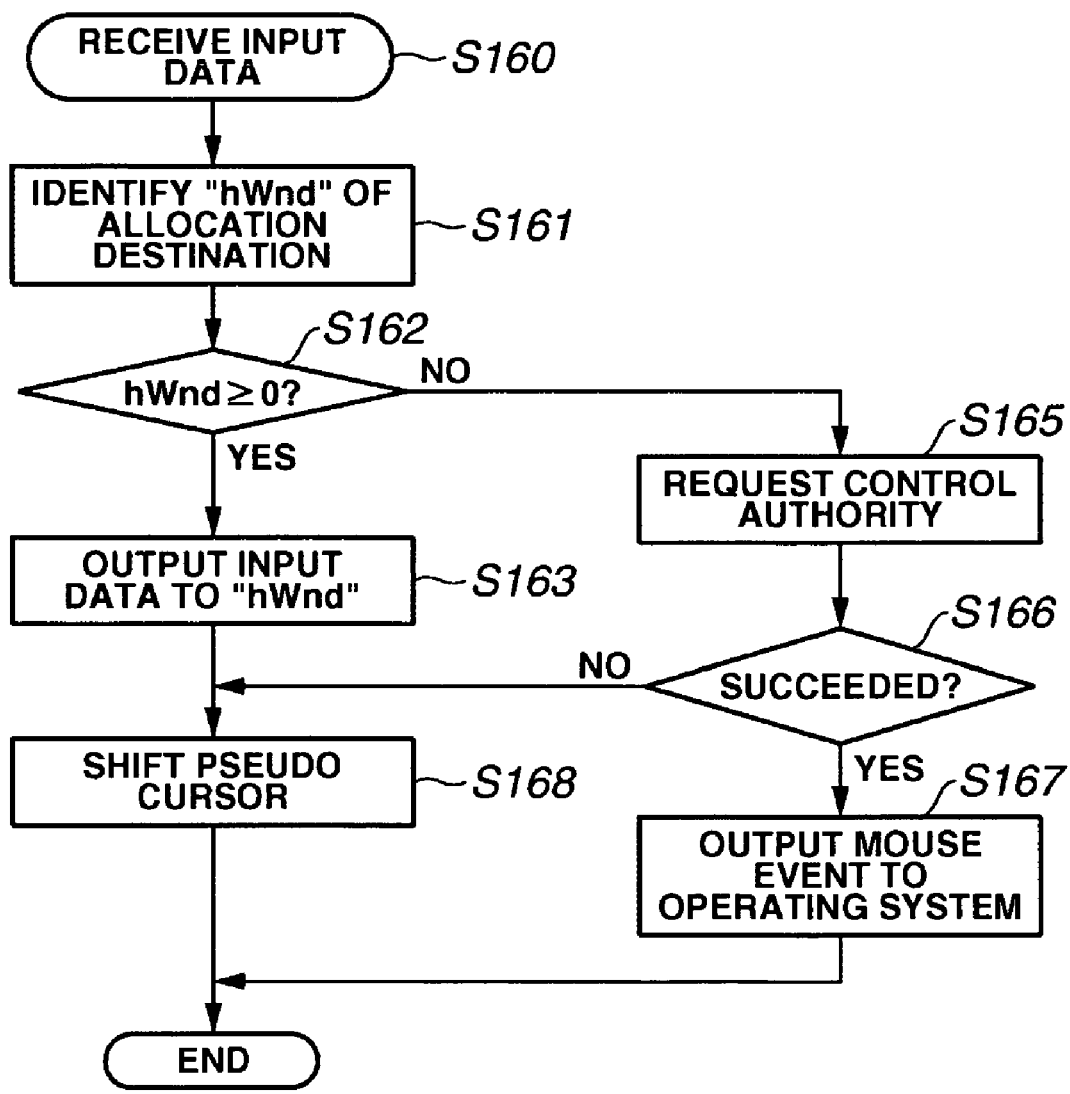
FIG. 18 is a flowchart showing an operation of an input control section performed in response to input of data in accordance with the second embodiment of the present invention.

FIG. 18 is a flowchart showing an operation of the input control section 104 performed in response to input of data in accordance with the second embodiment. The flowchart of FIG. 18 is similar to the flowchart of FIG. 9. The difference is that FIG. 18 includes step S168 for shifting a pseudo cursor.

First, in step S160, the input control section 104 receives data. Then, the control flow proceeds to step S161, in which the input control section 104 identifies a window handle "hWnd" of the allocation destination by accessing the input allocating section 106. Then, in step S162, it is determined whether the window handle "hWnd" of the allocation destination is the operation control section 107 or other application 109. When the window handle "hWnd" is the operation control section 107 (i.e., YES in step S162), the control flow proceeds to step S163 in which the input control section 104 outputs the input data to the window handle "hWnd". Then, in step S168, the input control section 104 shifts a pseudo cursor to the coordinates of input data.

When the window handle "hWnd" is not the operation control section 107 (i.e., NO in step S162), the control flow proceeds to step S165 in which the input control section 104 requests control authority for the input data by accessing the control authority managing section 105. Next, in step S166, the input control section 104 confirms an obtained result with respect to the control authority. When no control authority is obtained (i.e., NO in step S166), the control flow proceeds to step S168 in which the input control section 104 shifts a pseudo cursor to the coordinates of input data before terminating the processing.

When the control authority is obtained (i.e., YES in step S166), the control flow proceeds to step S167 in which the input control section 104 outputs a mouse event to the operating system 108 before terminating the processing.

Third Embodiment

Figure 19:
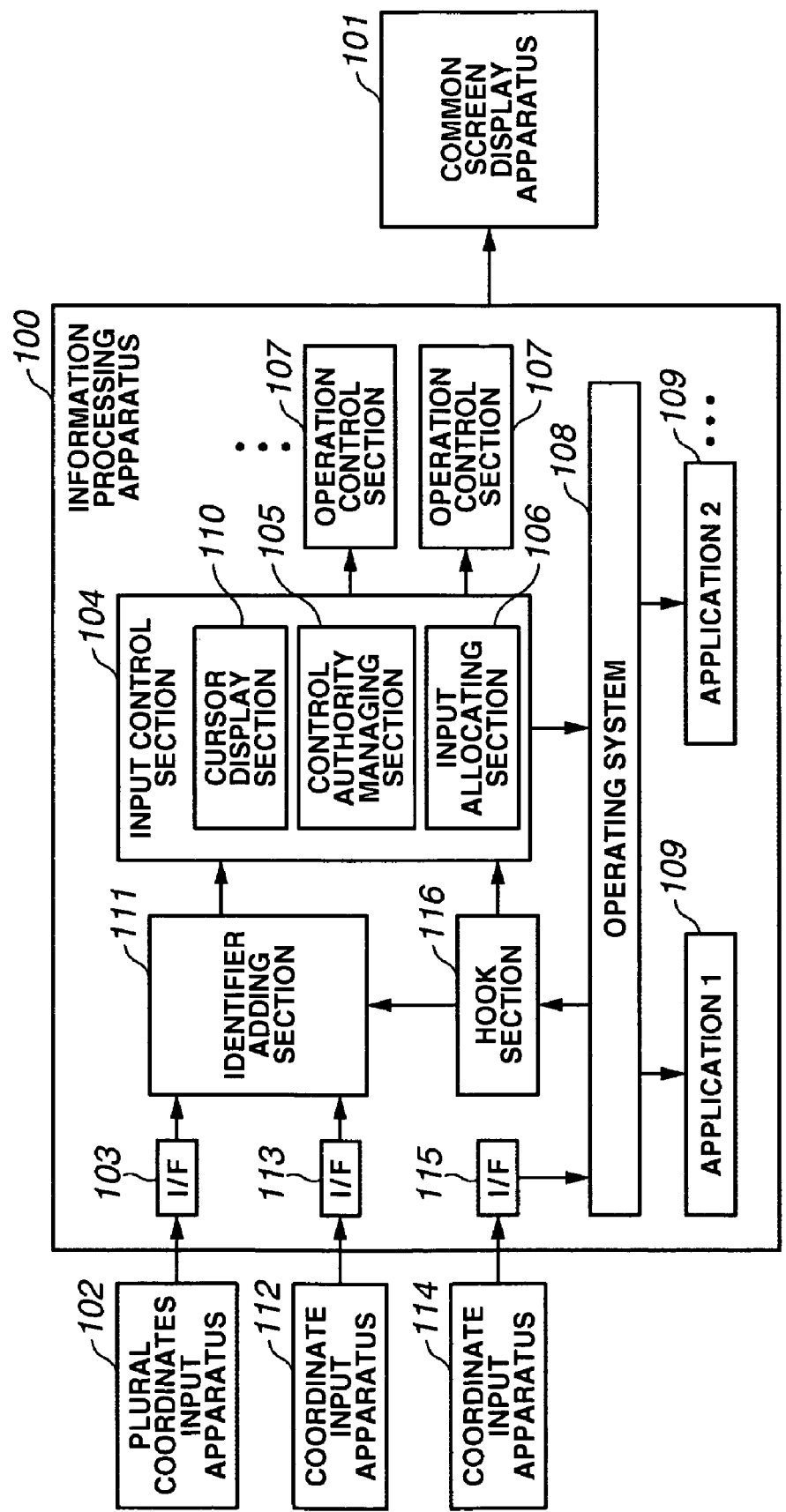
FIG. 19 is a block diagram showing a functional arrangement of a cooperative work supporting system in accordance with a third embodiment of the present invention.

FIG. 19 is a block diagram showing a functional arrangement of a cooperative work supporting system in accordance with a third embodiment of the present invention. Portions or components identical with or common to those described in the first or second embodiment are denoted by the same reference numerals shown in FIG. 1 or 2 and will not be described in the following.

In addition to the components of the first and second embodiments, the third embodiment includes an identifier adding section 111 that adds an identifier. Thus, a coordinate input apparatus having no capability of adding an identifier can be used in the third embodiment.

The third embodiment illustrates only one component with respect to each of the plural coordinates input apparatus 102, the coordinate input apparatus 112, and the coordinate input apparatus 114. However, a practical arrangement of the third embodiment is not limited to the disclosed one. The number and combination of these apparatuses can be changed.

The arrangement shown in FIG. 19 is different from the arrangement shown in FIG. 14 in that FIG. 19 includes the identifier adding section 111, a coordinate input apparatus 112, an interface 113 of the coordinate input apparatus 112, a coordinate input apparatus 114, an interface 115 of the coordinate input apparatus 114, and a hook section 116. The information processing apparatus 100 of the third embodiment is similar in hardware arrangement to that of the first embodiment, and will not be described in the following.

The identifier adding section 111 receives data from the interface 103, the interface 113, and the hook section 116. The identifier adding section 111 adds an identifier that is unique to each input device, and outputs the identifier to the input control section 104. The coordinate input apparatus 112 is a mouse or a comparable input apparatus that is connected to the interface 113. The interface 113 receives coordinate data from the coordinate input apparatus 112 and directly outputs the coordinate data to the identifier adding section 111. The coordinate input apparatus 114 is a mouse or a comparable input apparatus that is connected to the interface 115. The interface 115 outputs a system-mouse event to the operating system 108 according to an input from the coordinate input apparatus 114.

The data from the plural coordinates input apparatus 102 and from the coordinate input apparatus 112 include an identifier. Furthermore, the data identifier adding section 111 can add an identifier unique to an input device of the data. Thus, with respect to each of the plural coordinates input apparatus 102 and the coordinate input apparatus 112, a plurality of apparatuses can be connected to the information processing apparatus 100.

The hook section 116 monitors a system-mouse event generated from the operating system 108. The hook section 116 prevents the operating system 108 from executing the processing when the system-mouse event is not based on an output from the input control section 104. A plurality of coordinate input apparatuses 114 can be connected to the information processing apparatus 100. In such a case, the system-mouse event hooked by the hook section 116 can be analyzed to identify input information peculiar to each coordinate input apparatus 114. Thus, the coordinate input apparatus 114 that generated the data can be identified.

An identifier can be added to the data before the data is output to the identifier adding section 111. For example, a tablet, a touch panel, or a digitizer is a coordinate input apparatus that outputs absolute coordinates. On the other hand, a mouse or a scratch pad is a coordinate input apparatus that outputs relative coordinates. Thus, identifying a coordinate input apparatus that supplied the data can be realized using a flag that indicates the type of data, i.e., absolute coordinates or relative coordinates.

However, such identification is unfeasible when a plurality of the coordinate input apparatuses 114 is a mouse type. In this case, the mouse-type input apparatuses are handled as the same coordinate input apparatus 114.

When the coordinate input apparatuses 114 are a plurality of tablet-type input apparatuses that output absolute coordinates, the coordinate input apparatuses 114 can be identified by their traces. Thus, individual coordinate input apparatuses 114 can be identified by monitoring their input coordinate values, even when the coordinate input apparatuses 114 simultaneously input the coordinate data. In this manner, adding an identifier to each trace (i.e., to each coordinate input apparatus 114) is feasible based on the discriminated coordinate values.

FIG. 20 is a view showing one example of an identifier management list stored in the identifier adding section 111 in accordance with the third embodiment. An identifier management list 1800 includes a pair of data "Device identifier" and "Identifier" for each index, wherein "Device identifier" indicates an input device (i.e., a device from which the coordinate data is entered).

The sections or circuits succeeding the input control section 104 use the paired data in the identifier management list 1800. In the third embodiment, "Device identifier" is a process ID of the input device. However, input data may contain an identifier. For example, input data from the interface 103 of the plural coordinates input apparatus 102 or input data from the hook section 116 contains an identifier. In such a case, a process ID of the input device can be linked with the identifier of input data to obtain a device identifier.

Figure 21:
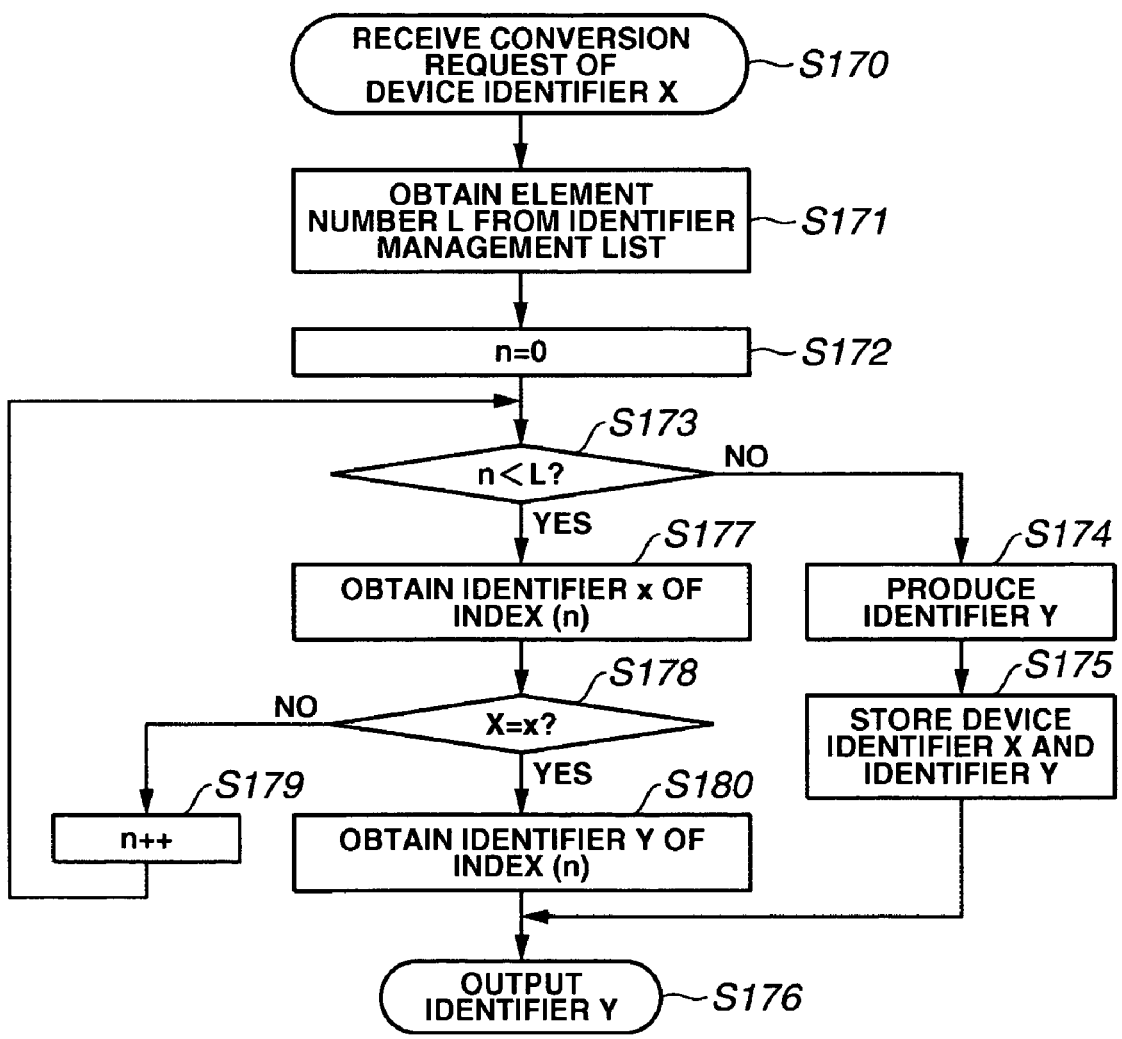
FIG. 21 is a flowchart showing an operation of the identifier adding section that obtains an identifier corresponding to a device identifier in accordance with the third embodiment of the present invention.

FIG. 21 is a flowchart showing an operation of the identifier adding section 111 that obtains an identifier corresponding to a device identifier in accordance with the third embodiment. Program for the processing is loaded to RAM 202 and is executed under control of CPU 201.

First, in step S170, the identifier adding section 111 receives a conversion request of the device identifier X. Then, in step S171, the identifier adding section 111 obtains an element number L from the identifier management list. Next, in step S172, index n is initialized to 0. Next, in step S173, it is determined whether the value of index n is smaller than the element number L of the list. When the value of index n is not smaller than the element number L (i.e., NO in step S173), the control flow proceeds to step S174 in which the identifier adding section 111 newly produces an identifier Y corresponding to the device identifier X.

Next, in step S175, the identifier adding section 111 stores both the device identifier X and the identifier Y in the identifier management list 1800. Then, in step S176, the identifier adding section 111 outputs the identifier Y. When the value of index n is smaller than the element number L (i.e., YES in step S173), the control flow proceeds to step S177 in which the identifier adding section 111 obtains a device identifier x of Index (n). Next, in step S178, the device identifier X is compared with x.

When the device identifier X is different from x (i.e., NO in step S178), the control flow proceeds to step S179 to increment the index n by +1, and then returns to step S173. When the device identifier X is equal to x (i.e., YES in step S178), the control flow proceeds to step S180 in which the identifier adding section 111 obtains an identifier Y of Index (n). Then, in step S176, the identifier adding section 111 outputs the identifier Y.

The processes performed in the apparatuses or sections succeeding the input control section 104 are identical with that in the second embodiment. As described above, according to the above-described embodiments, the information processing apparatus displays screens on the common screen display apparatus. The plural coordinates input apparatus is connected to the information processing apparatus. The plural coordinates input apparatus is usable as a means for specifying a user. A plurality of users can simultaneously use the information processing apparatus. The system gives each user the feeling as if only the user can use the information processing apparatus.

More specifically, when many users are on an application of white board or annotation, the users can use the system without any interference. Meanwhile, the system allows one user to exclusively use other application, when the user possesses the control authority. Furthermore, the capability of displaying a pseudo cursor for each user allows mouse-users or tablet-users to use the system. Furthermore, a plurality of coordinate input apparatuses can be freely connected to the information processing apparatus without considering the compatibility with the system.

The system can be used in the same manner as in a case that only one plural coordinates input apparatus is connected to the information processing apparatus.

According to the present invention, the software program(s) realizing the above-described functions of the present embodiments can be directly or remotely supplied to the system or the apparatus. The system or the apparatus, i.e., a computer installed therein, can read and execute the supplied program codes to realize the functions of the present embodiments. In this case, equivalents of programs can be used if they possess comparable functions. Accordingly, when the functions or processes of the present invention are realized by a computer, program codes installed in the computer are also means for realizing the present invention.

In other words, the present invention is applied to computer programs that can realize the functions or processes of the present invention. In this case, the type of program(s) can be selected from any one of object codes, interpreter programs, and OS script data.

A recording medium supplying the program can be selected from any one of a floppy disk, hard disk, optical disk, magneto-optical disk, MO, CD-ROM, CD-R, CD-RW, magnetic tape, nonvolatile memory card, ROM, DVD (DVD-ROM, DVD-R).

The method for supplying the program(s) includes accessing a home page on the Internet using the browsing function of a client computer, when the home page allows each user to download the computer programs of the present invention, or compressed files having automatic install functions, to a hard disk or other recording medium of the user.

Furthermore, the program codes constituting the programs of the present invention can be divided into a plurality of files so that respective files are downloadable from different home pages. Namely, the present invention can be applied to Internet servers that allow numerous users to download the program files so that the functions or processes of the present invention can be realized on their computers.

Furthermore, enciphering the programs of the present invention and storing the enciphered programs in a CD-ROM or comparable recording medium is a practical method when the programs of the present invention are distributed to the users. The authorized users (i.e., users satisfying predetermined conditions) are allowed to download key information from a home page on the Internet. The users can decipher the programs using the key information and can install the programs on their computers. When the computer reads and executes the installed programs, the functions of the above-described embodiments can be realized.

Furthermore, based on an instruction of the program, the operating system running on the computer may execute part or all of the processing so that the functions of the above-described embodiments can be realized.

Furthermore, the program read out of a recording medium can be written into a memory of a feature expansion board equipped in a computer or into a memory of a feature expansion unit connected to the computer. In this case, based on an instruction of the program, the CPU provided on the feature expansion board or the feature expansion unit can execute part or all of the processing so that the functions of the above-described embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-014681 filed Jan. 21, 2005, which is hereby incorporated by reference herein in its entirety.

What is claimed is:

1. An information processing apparatus comprising:
a memory storing instructions; and
a processor operably connected to the memory to read and execute the instructions from the memory to:
input data including coordinate data input by using a coordinate pointer and identification information of the coordinate pointer;
an execution unit configured to execute a first application in which an operable coordinate pointer is confined to the coordinate pointer holding a control authority and a second application in which the operable coordinate pointer is not confined to the coordinate pointer holding the control authority,
memorize a region and back-and-forth relationship of windows of the applications executed,
acquire information on the region and the back-and-forth relationship of the windows from the operating system in response to a change of the region and/or the back-and-forth relationship of the windows and to update information memorized based on the acquired information,
determine whether the acquiring process for acquiring the control authority is to be performed, based on the region of the window of the application which has been executed and the coordinate data input by using the coordinate pointer,
acquire the control authority for operating the first application based on the identification information, in accordance with the determination,
determine whether the coordinate data is contained in the region of the window of the second application, based on the region and the back-and-forth relationship of the windows memorized and the coordinate data, and output, to the second application corresponding to the coordinate data, an event according to the input data when a determination is made that the coordinate data is contained in the region of the window of the second application.

2. The information processing apparatus according to claim 1, wherein the processor operabley connected to the memory, reads and executes the instructions stored in the memory to release the control authority when coordinate data is not entered for a predetermined time by using the coordinate pointer corresponding to the identification information currently holding the control authority.

3. The information processing apparatus according to claim 1, wherein the processor operabley connected to the memory, reads and executes the instructions stored in the memory to release the control authority when coordinate data corresponding to the identification information currently holding the control authority is continuously entered a predetermined number of times.

4. The information processing apparatus according to claim 1, wherein the processor operabley connected to the memory, reads and executes the instructions stored in the memory to output an event to an operating system when the control authority is acquired for operating the first application and to display a cursor indicating a position of the coordinate data when the event is output to the second application or the operating system.

5. The information processing apparatus according to claim 4, wherein the processor operabley connected to the memory, reads and executes the instructions stored in the memory to cancel the display of the cursor when coordinate data corresponding to the cursor is not entered for a predetermined time.

6. The information processing apparatus according to claim 4, wherein the processor operabley connected to the memory, reads and executes the instructions stored in the memory to cancel the display of the cursor when coordinate data corresponding to the cursor is continuously entered a predetermined number of times.

7. The information processing apparatus according to claim 1, wherein the processor operabley connected to the memory, reads and executes the instructions stored in the memory to transfer a message according to the coordinate data and the identification information to the second application and determines whether the coordinate data is contained in the region of the window of the second application in response to a response to the message from the second application.

8. A method for controlling an information processing apparatus, the method comprising:

an inputting step of inputting data including coordinate data input by using a coordinate pointer and identification information of the coordinate pointer;

an execution step of executing a first application in which an operable coordinate pointer is confined to the coordinate pointer holding a control authority and a second application in which the operable coordinate pointer is not confined to the coordinate pointer holding the control authority;

a window order memorizing step of memorizing, in a memory, a region and back-and-forth relationship of windows of the applications executed in the execution step;

an updating step of acquiring information on the region and the back-and-forth relationship of the windows from the operating system in response to a change of the region and/or the back-and-forth relationship of the windows and of updating information memorized in the window order memorizing step based on the acquired information;

an acquisition determination step of determining whether the acquiring process for acquiring the control authority is to be performed, based on the region of the window of the application which has been executed in the execution step and the coordinate data input by using the coordinate pointer;

an acquisition step of acquiring the control authority for operating the first application based on the identification information, in accordance with the determination in the acquisition determination step;

a window determination step of determining whether the coordinate data is contained in the region of the window of the second application, based on the region and the back-and-forth relationship of the windows memorized in the memory and the coordinate data; and an outputting step of outputting, to the second application corresponding to the coordinate data, an event according to the input data when the windows determination step determines that the coordinate data is contained in the region of the window of the second application.

9. The method for controlling an information processing apparatus according to claim 8, further comprising a step of releasing the control authority when coordinate data is not entered for a predetermined time by using the coordinate pointer corresponding to the identification information currently holding the control authority.

10. The method for controlling an information processing apparatus according to claim 8, further comprising a step of releasing the control authority when coordinate data corresponding to the identification information currently holding the control authority is continuously entered a predetermined number of times.

11. The method for controlling an information processing apparatus according to claim 8, further comprising a step of outputting an event to an operating system when the acquisition step acquires the control authority for operating the first application and of displaying a cursor indicating a position of the coordinate data when the event is output to the second application or the operating system.

12. The method for controlling an information processing apparatus according to claim 11, further comprising a step of canceling the display of the cursor when coordinate data corresponding to the cursor is not entered for a predetermined time.

13. The method for controlling an information processing apparatus according to claim 11, further comprising a step of canceling the display of the cursor when coordinate data corresponding to the cursor is continuously entered a predetermined number of times.

14. A computer-executable program stored on a computer-readable medium, the program causing a computer to execute a first application in which an operable coordinate pointer is confined to a coordinate pointer holding a control authority and a second application in which the operable coordinate pointer is not confined to the coordinate pointer holding the control authority, comprising:

an inputting step of inputting data including coordinate data input by using a coordinate pointer and identification information of the coordinate pointer;

a window order memorizing step of memorizing, in a memory, a region and back-and-forth relationship of windows of the applications executed in the execution step;

an updating step of acquiring information on the region and the back-and-forth relationship of the windows from the operating system in response to a change of the region and/or the back-and-forth relationship of the windows and of updating information memorized in the window order memorizing step based on the acquired information;

an acquisition determination step of determining whether the acquiring process for acquiring the control authority is to be performed, based on the region of the window of the identification which has been executed in the execution step and the coordinate data input by using the coordinate pointer;

an acquisition step of acquiring the control authority for operating the first application based on the identification information, in accordance with the determination;

a window determination step of determining whether the coordinate data is contained in the region of the window of the second application, based on the region and the back-and-forth relationship of the windows memorized and the coordinate data; and an outputting step of outputting, to the second application corresponding to the coordinate data, an event according to the input data when the window determination step determines that the coordinate data is contained in the region of the window of the second application.

* * * * *